United States Patent
Porter

(10) Patent No.: US 10,394,853 B2
(45) Date of Patent: Aug. 27, 2019

(54) PROVIDING A SELF-MAINTAINING AUTOMATED CHAT RESPONSE GENERATOR

(71) Applicant: QUALTRICS, LLC, Provo, UT (US)

(72) Inventor: Michael Porter, Springville, UT (US)

(73) Assignee: Qualtrics, LLC, Provo, UT (US)

( * ) Notice: Subject to any disclaimer, the term of this patent is extended or adjusted under 35 U.S.C. 154(b) by 51 days.

(21) Appl. No.: 15/681,858

(22) Filed: Aug. 21, 2017

(65) Prior Publication Data

US 2019/0057143 A1 Feb. 21, 2019

(51) Int. Cl.
| | | |
|---|---|---|
| *G06N 5/00* | (2006.01) | |
| *G06F 16/28* | (2019.01) | |
| *G06Q 10/06* | (2012.01) | |
| *G06Q 10/10* | (2012.01) | |
| *G06Q 30/00* | (2012.01) | |
| *H04L 12/18* | (2006.01) | |

(52) U.S. Cl.
CPC ............. *G06F 16/285* (2019.01); *G06N 5/00* (2013.01); *G06Q 10/063114* (2013.01); *G06Q 10/10* (2013.01); *G06Q 30/016* (2013.01); *H04L 12/1822* (2013.01)

(58) Field of Classification Search
None
See application file for complete search history.

(56) References Cited

U.S. PATENT DOCUMENTS

| | | | | |
|---|---|---|---|---|
| 6,029,195 | A * | 2/2000 | Herz | G06Q 30/02 725/116 |
| 9,679,030 | B2 * | 6/2017 | Hatami-Hanza | G06N 5/022 |
| 9,747,895 | B1 * | 8/2017 | Jansche | G10L 15/183 |
| 2003/0028441 | A1 * | 2/2003 | Barsness | G06Q 30/02 705/26.1 |
| 2004/0015397 | A1 * | 1/2004 | Barry | G06Q 30/02 705/14.55 |
| 2010/0205541 | A1 * | 8/2010 | Rapaport | G06Q 10/10 715/753 |
| 2014/0278378 | A1 * | 9/2014 | Mellett | G06F 17/2785 704/9 |
| 2015/0127340 | A1 * | 5/2015 | Epshteyn | G10L 15/26 704/235 |

* cited by examiner

*Primary Examiner* — Marcus T Riley
(74) *Attorney, Agent, or Firm* — Keller Jolley Preece

(57) ABSTRACT

The present disclosure is directed toward systems and methods for providing a self-maintaining automated chat response generator. In particular, the systems and methods described herein analyze a corpus of digital content to identify content topics and generate a language model for categorizing a chat question. Additionally, the systems and methods described herein analyze a chat question to assign the chat question to a content topic based on keywords identified within the chat question. The systems and methods also generate a response to provide to the chat question.

20 Claims, 10 Drawing Sheets

PROVIDING A SELF-MAINTAINING AUTOMATED CHAT RESPONSE GENERATOR

BACKGROUND

Individuals and businesses alike frequently require help (e.g., customer service) for products and/or services. For instance, an individual can require technical assistance when inquiring about an online service. As an example, a business manager can need help from an online survey service to explain how to set up and manage a digital survey to be sent to customers. Oftentimes, online service providers offer technical assistance to customers by way of an online chat interface. In some conventional systems, and with the advent of natural language processing, many online service providers utilize automated response generators to provide responses to chat questions. While conventional automated response generators provide some benefits, conventional systems have several disadvantages.

For example, conventional systems create a sense of detachment in users because conventional systems generate responses having characteristics that indicate the response is computer generated, thus leaving a user feeling frustrated and devalued due to the impersonal communication. In other words, conventional systems often generate a response that has a robotic and formulaic structure that is much different than the tone and structure of actual human interaction. In addition, many conventional systems generate responses that have significant sentence structure errors, spelling errors, or other errors that make the response confusing or unintelligible. Accordingly, many conventional systems lack the ability to create a positive interaction with a customer due to the various characteristics that clearly indicate a response is computer generated.

Additionally, conventional systems are often ineffective at providing accurate responses to chat questions. Particularly, conventional systems frequently provide generated responses with little or no relevance to the chat question posed by a user. For example, conventional systems often create a response that includes words out of order so that a user cannot understand what the response is supposed to mean. In other cases, and because conventional systems are based on a formulaic structure, the responses that conventional systems are capable of creating are often short and discrete segments of information. These short and discrete responses fail to provide adequate or accurate information in response to a user's question. Based on the above technical limitations with conventional systems, a user often has to rephrase an answer in hopes of generating a different response, or in other cases, the user often has to ask many questions to obtain an answer in small discrete segments.

Furthermore, many conventional systems require reprogramming to the response generator systems, methods, and algorithms to change how the conventional system generates a response. For example, administrators or programmers update conventional systems based on changing terminology, changing services (e.g., new or updated services), changing products (e.g., new or updated products), changing policies, and/or changing technology. Changing the programming systems of conventional systems is technically challenging and often results in errors, unintended system consequences, and bugs that can cause conventional systems to crash. Accordingly, conventional systems are often unstable, unpredictable, and difficult to update.

Thus, there are several disadvantages with regard to conventional automated chat response systems.

SUMMARY

One or more embodiments described herein provide benefits and solve one or more of the foregoing or other problems in the art with systems and methods for providing a self-maintaining automated chat response generator. In particular, the systems and methods identify content topics within a digital content body (e.g., a body of text, such as one or more support pages), where each of the content topics corresponds to terms. In addition, the systems and methods generate a language model that describes relational rules between the terms and each of the content topics. Furthermore, the systems and methods monitor the digital content body for changes to the digital content therein, and, upon detecting a change to the digital content, the systems and methods update the language model to reflect new topics, deleted topics, or relational changes between terms and topics.

The systems and methods further receive and analyze a chat question (e.g., a question provided by a user by way of a chat interface) to identify keywords therein. Additionally, the systems and methods categorize the received chat question into one or more of the content topics by applying the generated language model to the keywords identified from the chat question. Furthermore, the systems and methods generate and provide a chat response to the user, where the chat response corresponds to a content portion (e.g., a digital content portion from within the digital content body) related to the content topic that is matched with the chat question.

Additional features and advantages of the present application will be set forth in the description which follows, and in part will be obvious from the description, or can be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
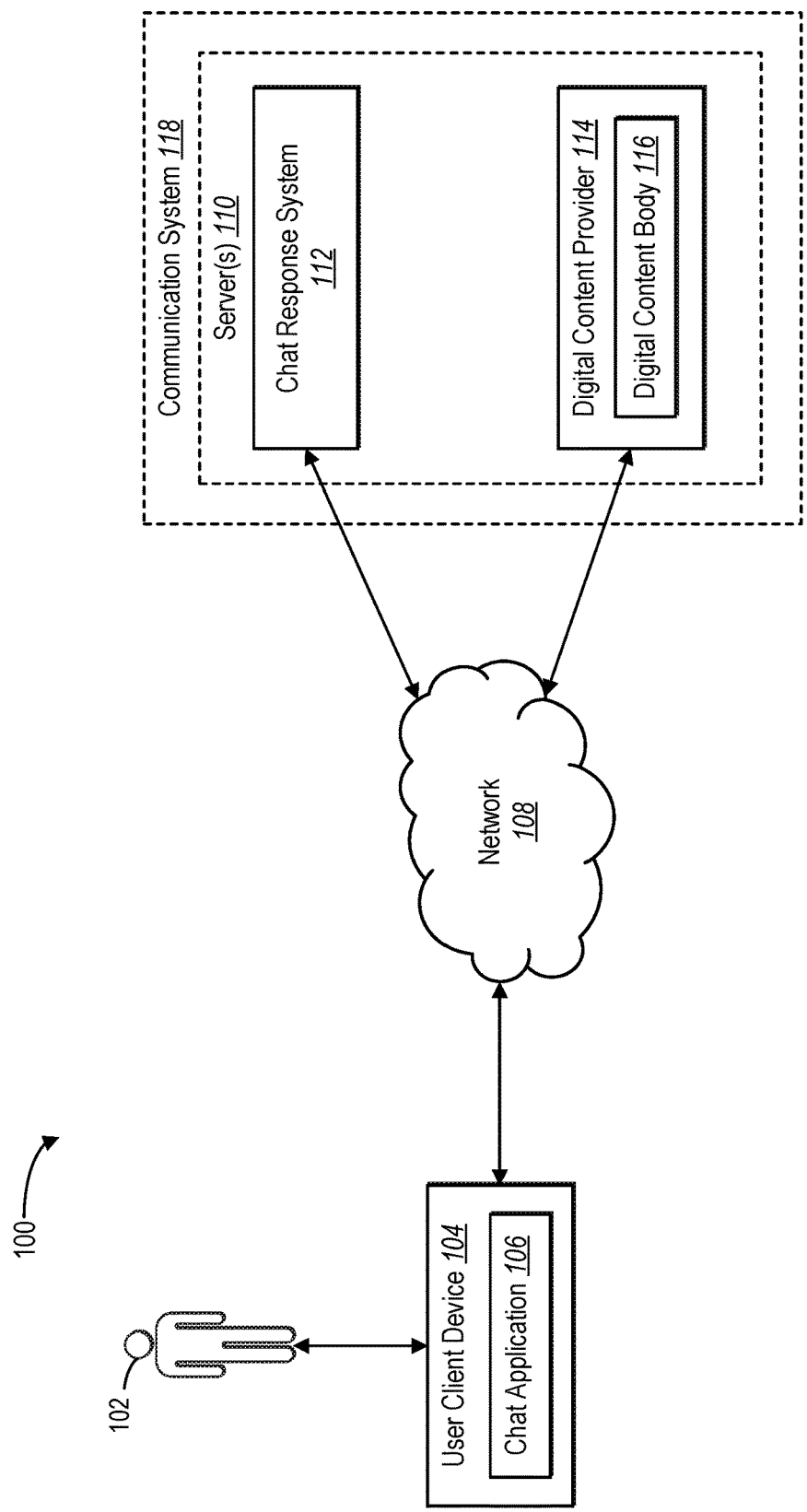
FIG. 1 illustrates a schematic diagram of an example environment of a chat response system in accordance with one or more embodiments.

One or more embodiments described herein provide benefits and solve one or more of the foregoing or other problems in the art with a self-maintaining automated chat response system (or simply "chat response system"). In particular, the chat response system described herein generates a language model based on an analysis of a digital content body (e.g., a support page and/or other digital document or corpus). For example, the chat response system creates a plurality of content topics corresponding to different sections or subjects identified within the digital content body. Accordingly, the chat response system generates a language model that describes relational rules between the content topics and content terms within the digital content body. In addition, the chat response system monitors the digital content body for any changes to the digital content therein, and, upon detecting a change to the digital content, updates the language model to reflect any relational changes between the content topics and content terms.

The chat response system further receives and analyzes a chat question (e.g., a user-provided question by way of a chat interface) to identify keywords within the chat question. Additionally, the chat response system categorizes the chat question into a content topic by applying the generated language model to the keywords identified within the chat question. Based upon categorizing the chat question into the content topic, the chat response system can identify a content portion from within the digital content body that relates to the content topic associated with the chat question. Furthermore, the chat response system can generate and provide a chat response to the user, where the chat response includes the identified content portion from the digital content body that corresponds to the content topic associated with the chat question.

In one or more embodiments, and to create a language model, the chat response system analyzes a digital content body to identify content terms indicative of content topics. In particular, the chat response system analyzes the digital content body and identifies or otherwise generates one or more content topics that describe various content portions or sections within the digital content body. To illustrate, in at least one embodiment, the chat response system organizes the digital content body into topics designated by section headings or titles.

In addition, the chat response system analyzes each identified content portion (e.g., text or other digital content) that is associated with a content topic to identify content terms indicative of each content topic. In particular, the chat response system identifies certain words, phrases, symbols, etc. that define (e.g., are related to, dispositive of, etc.) a particular content topic and uses those identified content terms (e.g., words, phrases, symbols, etc.) to generate a language model for the digital content body. Generally, the language model represents relationships between one or more content terms, content topics, and/or content terms and content topics.

For example, the chat response system uses the identified content terms (e.g., the words, phrases, symbols, etc. that are indicative of particular content topics) as identifiers (e.g., definitions) that correspond to the content topics. Additionally, the chat response system can analyze the digital content body to determine relational rules between content terms. For example, the chat response system determines how the content terms relate to each other, or a similarity or dissimilarity between two or more words within the digital content body. By thus generating a language model, the chat response system generates, for each content topic, a set of content terms and accompanying relational rules that define the content topic.

In addition to using content within the digital content body to generate a language model, the chat response system monitors and analyzes chat histories between users and live customer support agents (e.g., chat histories between two human users). For example, the chat response system maintains a chat history of a chat session between a user and a customer support agent. In at least one embodiment, the chat response system analyzes the chat history to identify chat terms used by the user and/or the customer support agent. The chat response system further determines relational rules of the chat terms, alone or in conjunction with the relational rules determined from the content terms of the digital content body.

In this way, the chat response system generates a language model that defines relational rules between words based not only on the analysis of the digital content body, but further based on the analysis of the chat history. Thus, in these embodiments, the chat response system defines content topics based on identified chat terms as well as content terms. As will be explained further below, the chat response system uses the language model to generate responses to user-provided chat questions.

In addition to generating a language model, the chat response system monitors the digital content body and/or additional chat histories. For example, the chat response system monitors the digital content body to detect a change of content within the digital content body. To illustrate, the chat response system detects added words, deleted words, changes in sentence organization, etc. within the digital content body. For example, if a service provider (e.g., a survey service provider) rolls out a new technology and updates the digital content body to include a description of the new technology, the chat response system detects the change of content and identifies new content terms and/or changes to previously identified content terms.

In response to detecting a change of content within the digital content body and/or the chat history, the chat response system updates the language model. In particular, upon detecting added and/or deleted content terms, altered sentence structure, or other updates or changes to the digital content body and/or chat history, the chat response system regenerates the language model. In one or more embodiments, the chat response system updates the language model by redefining the content topics to reflect the changes in the digital content body and/or chat history. To illustrate, the chat response system updates the various content topics to include added content terms and/or added chat terms that are added to the digital content body and/or the chat history. Likewise, the chat response system updates the various content topics to remove deleted content terms and/or deleted chat terms that are eliminated from the digital content body and/or the chat history. Additionally, the chat response system can alter the relational rules between the content terms and/or chat terms in response to the changes of the digital content body and/or the chat history.

As mentioned above, the chat response system further receives a chat question from a user. In particular, the chat response system receives a user-provided and text-based chat question (e.g., a user question input into a chat interface). The chat response system analyzes the chat question to identify keywords within the chat question. For example, the chat response system identifies keywords within the chat question that relate to (e.g., are similar to, different from, synonymous with, etc.) content terms that the chat response system identified within the digital content body. Accordingly, the chat response system analyzes the chat question to identify keywords that are indicative of (e.g., that suggest) the subject matter of the chat question.

Based on the identified keywords, the chat response system analyzes the keywords of a chat question using the language model corresponding to a digital content body and/or chat histories. In particular, the chat response system uses the language model to categorize the chat question as corresponding to a particular content topic (e.g., a content topic associated with the digital content body described above). Indeed, the chat response system applies the language model to the keywords of the chat question to determine and assign a content topic to the chat question. To illustrate, the chat response system determines, for each keyword (or group of keywords) within a chat question, a relationship between the keyword and the content terms and chat terms within the language model. In this way, the chat response system determines a relatedness of the chat question to each of the content topics, and accordingly determines which of the content topics is the most similar or most relevant to the chat question.

In response to determining which of the content topics is most relevant, the chat response system further provides a corresponding chat response to the user. Indeed, in some embodiments, the chat response system identifies a portion (e.g., section) of the digital content body as corresponding to the chat question received from the user, and therefore provides (e.g., sends by way of a chat interface) that portion of the digital content body to the user as a chat response. For example, the chat response system identifies one or more content portions of the digital content body that correspond with the content topics that are most relevant to the chat question based on the language model. The chat response system can then provide the one or more portions of the digital content body to the user within a chat response.

In some embodiments, the chat response system synthesizes a content portion that the corresponds to the chat question based on the language model. For example, the chat response system generates a chat response using naturally spoken phraseology (e.g., word choice) and sentence structure based on the content portion that corresponds to the chat question. In other words, the chat response system generates and provides a chat response using less complicated technical terms while still conveying the necessary information to answer the chat question received from the user.

Based on the various features, functions, systems, and methods of the chat response system discussed above, as well as the additional details described below, the chat response system provides several advantages over conventional systems. In particular, the chat response system provides more targeted, conversational responses to users. For example, the chat response system provides responses that are easy to understand and less confusing because the chat response system generates a chat response that can include pre-composed text known to be clear and accurate. In addition, the chat response system can synthesize content to further clarify, simplify, and/or humanize a computer generated chat response. As a result, the chat response system is more accurate, more efficient (e.g., a user finds an answer fast than in conventional systems), and is therefore more effective in helping users to resolve support problems.

As briefly mentioned, the chat response system provides more accurate responses to chat questions compared to conventional systems. Indeed, by generating a language model based on significant content terms within a digital content body, and by categorizing digital content into content topics, the chat response system creates an accurate system that efficiently provides relevant information in response to a chat question. In other words, because the chat response system determines, based on sophisticated language analysis techniques, accurate relational rules between words given a specific and custom digital content body (and/or chat history), the chat response system efficiently and accurately determines portions of content that are relevant to a given chat question. Accordingly, the chat response system provides responses to a user's chat questions that are more likely to provide accurate, useful, and valuable answers.

Furthermore, the chat response system is self-maintaining. In particular, by monitoring the digital content body and/or the chat history to detect changes in content, and then modifying the language model accordingly, the chat response system self-updates the language model to remain up-to-date with any changes made to a digital content body regarding new or changed products, services, policies, etc. Similarly, the chat response system can update the language model based on trends, patterns, and/or other characteristics within chat histories to further refine and improve the language model. Thus, the chat response system is more stable and predictable compared to conventional systems. Moreover, the chat response system efficiently and automatically updates in response to detecting new content or content changes, thus allowing even novice users to update the chat response system by simply updating digital content.

By building the language model through an analysis of relevant content (e.g., the chat history and the digital content body), the chat response system described herein is more efficient than conventional chat systems. In particular, the chat response system described herein wastes less time analyzing content that is not beneficial to building a targeted language model, and the chat response system therefore performs faster. While conventional language models can analyze a corpus of text relating to tangential or off-topic subject matter, the chat response system described herein generates a language model based on language patterns identified within a specific digital content body and chat history to efficiently and accurately generate chat responses. Accordingly, the chat response system requires less computing and communication resources when compared to conventional systems.

Furthermore, because the chat response system categorizes digital content into content topics, the chat response system provides responses faster than conventional systems. For example, upon receiving a chat question, the chat response system categorizes the chat question into a content topic category within a digital content body. Based on categorizing the chat question, the chat response system narrows a search domain by focusing on, and searching within, a particular content topic category within the digital content body that is relevant to a user's chat question. In other words, instead of searching within an entire digital content body to determine a response to a chat question, the chat response system searches for a response within the bounds of the particular content topic category within a digital content body. Therefore, by categorizing digital content into content topic categories, categorizing received chat questions into content topic categories, and by searching for a response to the chat question within the bounds of topic categories, the chat response system provides responses more quickly and efficiently than conventional systems.

As used herein, "digital content" refers to electronic data. For example, digital content includes, but is not limited to, digital text, digital symbols (e.g., emojis), digital photos, digital video, digital audio, and/or a combination of the above. In one or more embodiments, digital content includes shareable data, that when shared, communicates a question or response. For example, digital content can refer to electronic messages sent and received via a communication platform. Moreover, digital content can include digital text intended for use within a chat response, as explained further below.

The term "digital content body" refers to a collection of digital content. For example, a digital content body can include a digital document that includes one or more types of digital content. In some embodiments, a digital content body is an electronic document (e.g., webpage, word-processing document, or other format of digital content) that includes digital text. For instance, a digital content body can refer to an electronic document that includes customer support information (e.g., frequently asked questions and corresponding answers/responses), product or service information, or other information pertaining to a product/service provider. In one or more additional embodiments, a digital content body can include a chat history for one or more users. For instance, a chat history includes text-based messages and metadata (e.g., time stamps, user ID, geo-location, and other data) for electronic communications sent to, and received from, one or more users.

In addition, and as used herein, the term "content portion" or "content section" refers to digital content within a part of a digital content body. For example, a content portion can include a portion of an electronic document, such as one or more pages, paragraphs, or text groupings (e.g., denoted by headings, outlines, or other formatting characteristics). Furthermore, the term "digital content provider" refers to an organization, website, company, individual, or other entity that creates, manages, maintains, and/or updates digital content. For example, a digital content provider can provide, or otherwise offer access to digital content via a website, an electronic text document, a spreadsheet, or other corpus (e.g., digital content file(s)) that includes digital content. For instance, a digital content provider creates, maintains, removes, modifies, and/or updates a digital content body on a webpage.

More detail regarding the chat response system will now be provided with reference to the figures. In particular, FIG. 1 illustrates a schematic diagram of an example environment 100 for implementing a chat response system in accordance with one or more embodiments. Environment 100 will be described with relation to FIG. 1 as an overview of the self-maintaining automated chat response system 112 (referred to herein as "chat response system 112"). Thereafter, a more detailed description of the various features, functions, components, systems, and processes of the chat response system 112 is provided in relation to the subsequent figures.

As illustrated by FIG. 1, the chat response environment 100 includes a user client device 104 associated with a user 102. As used herein, a "user" refers to an individual, a group of individuals, an organization, a company, or other entity that is associated with a user client device 104, and that interacts with a chat response system. For example, user 102 can include a survey administrator using a digital survey service (e.g., a customer), a company that requires assistance from a distribution service, an individual that needs help from a telecommunications company, etc. Although FIG. 1 illustrates a single user client device 104 associated with a single user 102, in one or more embodiments, the chat response environment 100 includes more than one user client device, each associated with one or more users. In this way, the chat response system 112 communicates (e.g., simultaneously, in tandem, iteratively, etc.) with a number of user client devices via network 108.

As shown in FIG. 1, the chat response environment 100 depicts user 102 associated with user client device 104, and further depicts user client device 104 including a chat application 106. In particular, the chat application 106 provides, to the user 102 by way of the user client device 104, an interface (e.g., a graphical user interface or "GUI") by which the chat response system 112 communicates with the user 102. In some embodiments, the chat application 106 can be a web-based application (e.g., a website such as a support chatroom), or alternatively, the chat application 106 can be a mobile application (e.g., for a tablet and/or smartphone). In particular, the chat response system 112 can communicate with chat applications of various formats through various protocols to accommodate communication between the client device 104 and the chat response system 112.

In one or more embodiments, the chat response management system 112 maintains a user account (e.g., a paid account, a subscription account, etc.) associated with the user 102. For instance, the chat response system 112 can require the user 102 to register with the chat response system 112 to receive customer support (e.g., to receive responses from the chat response system 112). Additionally or alternatively, the chat response system 112 can verify that the user 102 uses products or services provided by the digital content provider 114 or other entity associated with the chat response system 112 before providing responses to the user 102. In some embodiments, the chat response system 112 is accessed through a generic web interface associated with a website, and a user can interact with the chat response system without having a permanent and/or previously established relationship with the chat response system 112 (e.g., a user clicks a "Help" link within a webpage to gain access to the chat response system 112).

As used herein, a "user client device" refers to a computing device with which a user interacts to send and receive digital communications (e.g., communicate with the chat response system 112). In particular, a user client device can include a computing device such as, for example, a desktop computer, a laptop computer, or a mobile device such as a tablet or smartphone. A user client device generally includes a keyboard, touchpad, touchscreen, or other user input component whereby the user client device receives input (e.g., interaction) from a user. In addition, the user client device generally includes a display screen that presents chat questions or other information to a user via a graphical user interface. Additional detail regarding user client devices are described below with respect to FIGS. 9 and 10.

FIG. 1 also shows that the environment 100 includes a digital content provider 114 that hosts or otherwise provides a digital content body 116. Although FIG. 1 depicts a single digital content provider 114 and a single digital content body 116, in some embodiments, the chat response environment includes multiple digital content providers, each housing one or more digital content bodies. As will be described below, the chat response system 112 communicates with the digital content provider 114 to access the digital content body 116. In particular, the chat response system 112 accesses the digital content body 116 to analyze one or more content portions and/or chat history portions to create a language model for use by the chat response system 112 to generate chat responses. In particular, the chat response system 112 communicates with the user client device 104 to receive a chat question (e.g., queries, inquiries, etc.), and the chat response system generates and provides a chat response to the user device 104 by analyzing the chat question using the language model.

Additionally, FIG. 1 illustrates that server(s) 110 can host the automated chat system 112 and/or the digital content provider 114. For instance, in at least one embodiment, the server(s) 110 can optionally host both the chat response system 112 and the digital content provider 114 (as indicated by the dotted lines surrounding server(s) 110 of FIG. 1). Furthermore, and as illustrated by the dotted lines of FIG. 1, the chat response system 112 and the digital content provider 114 can each be part of a communication system 118 (e.g., a customer support system). To illustrate, the communication system 118 can maintain a corpus of customer support texts in a database to implement an automated chat response system (e.g., chat response system 112) to provide customer support by referring to the customer support texts for information.

The server(s) 110 can communicate with the user client device 104 and/or the digital content provider 114 via network 108. In at least one embodiment, however, the chat response system 112, the user client device 104, and/or the digital content provider communicate directly, bypassing network 108. Additional detail regarding the network 108, user client device 104, server(s) 110 are described below with respect to FIGS. 9 and 10.

Generally, the environment 100 allows the chat response system 112 to receive chat questions from the user client device 104 (e.g., as entered by the user 102), analyze the chat question using the language model, determine a chat response to the chat question, and provide the determined response to the user 102 by way of the user client device 104. Additionally, the chat response system 112 is self-maintaining by monitoring the digital content body 116 to detect content changes, and then updating the language model based on any detected changes. Additional detail regarding the chat response system 112 and its operation is provided hereafter with reference to FIGS. 2-6.

Figure 2:
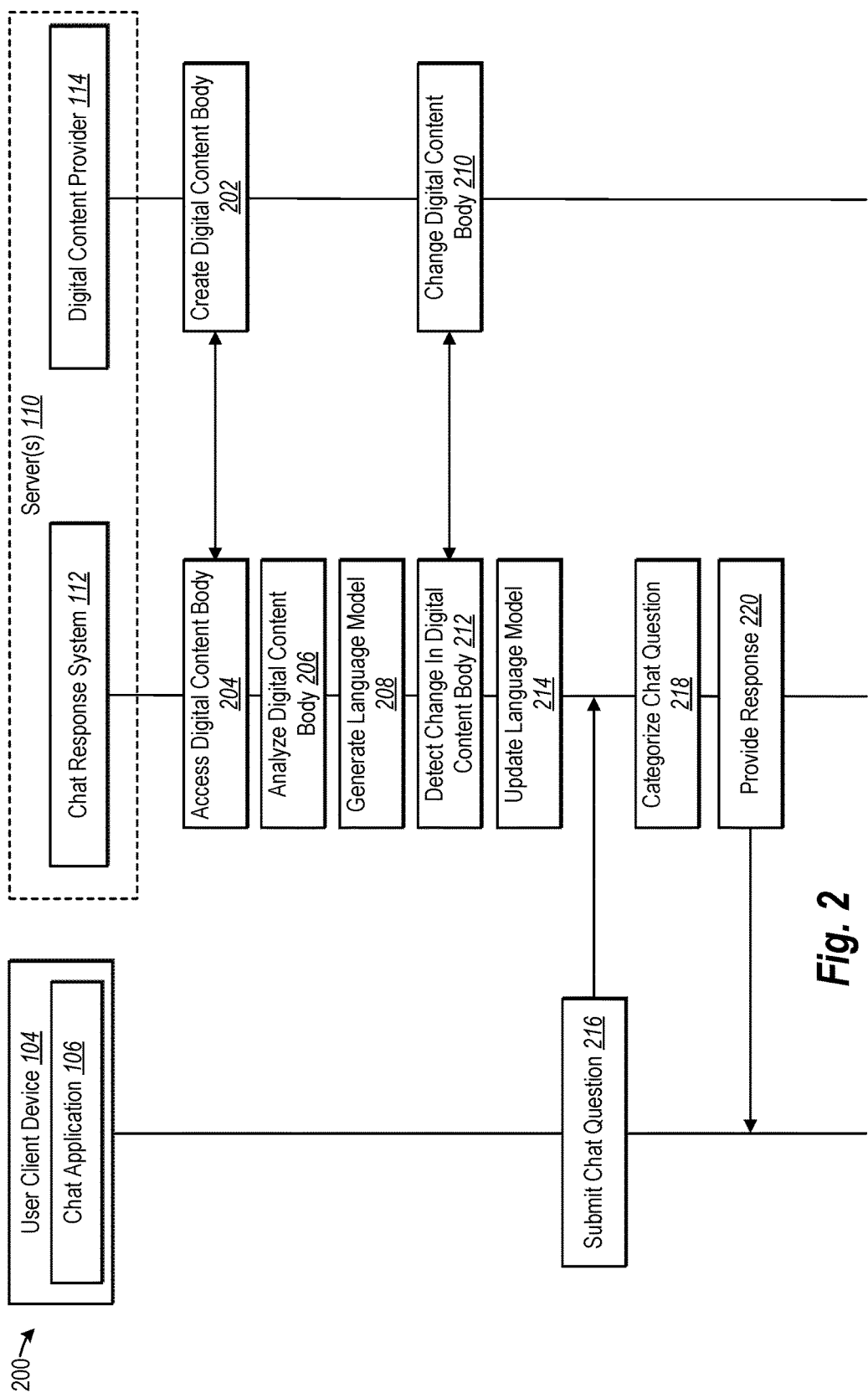
FIG. 2 illustrates a sequence diagram for analyzing a digital content body and for receiving and analyzing a chat question in accordance with one or more embodiments.

FIG. 2 illustrates a sequence flow diagram 200 including a series of acts. In particular, the sequence flow diagram 200 includes acts performed by one or more of the user client device 104, the chat response system 112, and/or the digital content provider 114. The sequence flow diagram 200 further illustrates the interaction between the user client device 104, and the server(s) 110 that host the chat response system 112 and the digital content provider 114. As discussed above with reference to FIG. 1, and as illustrated by the dashed-lines shown in FIG. 2, the server(s) 110 can include a single server or server system that hosts both the digital content provider 114 and the chat response system 112. Alternatively, the digital content provider 114 and the chat response system can be implemented on separate servers and/or separate server systems. Additionally, although the acts 202-220 of the sequence flow diagram 200 of FIG. 2 are shown in a particular order and as performed by a particular device and/or system, in some embodiments, one or more of the acts 202-220 can be performed in a different order and/or by a different device and/or system.

As illustrated by FIG. 2, the digital content provider 114 creates a digital content body (e.g., the digital content body 116 of FIG. 1), as shown by act 202. In particular, a user associated with the digital content provider 114 causes the digital content provider 114 to create a digital content body 116 that the digital content provider 114 makes accessible to one or more other systems (e.g., the chat response system 112). To illustrate, a user can cause the digital content provider 114 to create an electronic support document that includes information pertaining to products, services, and/or policies associated with the digital content provider 114 or other entity (e.g., a third-party company that provides products or services and that provides customer support for those products or services). In one or more embodiments, a user creates a digital content body 116 using one or more other applications or systems (e.g., word processors, webpage editors, or other electronic document creating applications), and then uploads the digital content body 116 to the digital content provider 114 (e.g., servers 110).

As further illustrated in FIG. 2, the chat response system 112 accesses the digital content body 116, as shown by act 204. Indeed, in some embodiments, the chat response system 112 detects the creation and or updating of the digital content body 116, and in response accesses the digital content body. In this way, the chat response system can monitor the status of the digital content body 116 on the digital content provider 114. Alternatively, the digital content provider 114 can send a notification or other indication that the digital content body 116 has been created or updated, which in turn causes the chat response system to access the new or updated version of the digital content body 116. In yet a further embodiment, the chat response system 112 accesses the digital content body 116 in response to the digital content provider 114 sending the digital content body to the chat response system 112.

Upon accessing the digital content body 116, the chat response system 112 analyzes the digital content body 116, as shown by act 206 of FIG. 2. In particular, in some embodiments, the chat response system 112 can utilize a text parsing technique to identify content topics, content portions, and content terms within the digital content body 116. For example, the chat response system 112 can detect paragraphs, section breaks, titles, pages, underlining, bolding, or other formatting characteristics within the digital content body to identify specific content portions of the digital content body 116 related to a content topic. In addition, the chat response system 112 can analyze the digital content body 116 to determine content terms related to content topics and/or content portions within the digital content body 116.

As mentioned, the chat response system 112 can identify content portions within the digital content body 116 based on analyzing the digital content body 116 (e.g., a segment, section, sentence, paragraph, or other portion of the digital content body 116). In particular, the chat response system 112 can identify a content portion as a portion of the digital content body 116 that relates to one or more content topics. For example, the chat response system 112 can identify a content portion as a segment of text following a heading, title, or other delineator and that indicates a content topic (e.g., underlined terms, large text terms, bold terms, or other format characteristic that signifies a title of a content topic). To illustrate, the chat response system can identify a content portion within the digital content body 116 that is associated with the content topic "Survey Results."

The chat response system 112 can identify content portions using a variety of techniques. In some embodiments, for example, the chat response system 112 parses the text of the digital content body 116 to identify different content portions. Indeed, in some cases, the chat response system 112 segments the digital content body 116 into content portions by recognizing a title or heading within the digital content body 116, and determining that the text following the recognized title and before the next title or heading is a particular content portion. In this way, the chat response system 112 separates the digital content body 116 into discernible content portions, each relating to a different title or heading that correspond to a content topic.

Additionally or alternatively, the chat response system 112 identifies content portions by content topic, as opposed to identifying content portions by physical location within the digital content body 116. In particular, the chat response system 112 analyzes the text of the digital content body 116 to extrapolate the meaning of each sentence or other group of words. Then, by comparing the subject matter (e.g., meaning) of each sentence, the chat response system 112 determines which sentences relate to content topics within the digital content body 116. The chat response system 112 thereby groups sentences together into content portions according to subject matter (e.g., content topic). Accordingly, in at least one embodiment, a content portion consists of segments of text from various locations throughout the digital content body 116—i.e., the content portion is not necessarily contiguous.

To determine which segments of text are related to similar content topics, in some embodiments, the chat response system 112 builds a mapping of content topics identified throughout the digital content body 116. As an example, the chat response system 112 identifies consecutive sentences as corresponding to two separate content topics, respectively, and thereby associates each sentence with their respective content topic. Then, as the chat response system 112 continues analyzing the digital content body 116, the chat response system determines whether subsequent sentences correspond to one of the two identified content topics. If not, the chat response system 112 creates a new content topic for those sentences that do not relate to any previously created content topics. Thus, as the chat response system 112 analyzes the entirety of the digital content body 116, the chat response system 112 assigns each sentence (or other denomination of digital content) to a content topic. In this way, the chat response system 112 can identify sentences or other pieces of text from various locations throughout the digital content body 116 as a single content portion—e.g., because they relate to a single content topic.

Furthermore, two or more content portions can include overlapping subject matter, and can therefore relate to one or more content topics. In other words, two or more content portions can relate to different content topics while also sharing one or more of the same content topic. For example, a first content portion can relate to content topics A and B, while a second content portion can relate to content topics B and C. Thus, while the first and second content portions are not entirely related to the same subject matter, the first and second content topics nonetheless share content topic B.

In some embodiments, the chat response system 112 can identify content portions based on identifying content terms within the digital content body 116 (content terms are described below). In some cases, the chat response system 112 identifies content portions by categorizing content portions according to identified content terms therein. In other words, the chat response system 112 defines a content portion using content terms. Accordingly, the chat response system 112 categorizes sentences, paragraphs, or other groups of words as a content portion based on the content terms identified therein.

As just mentioned, the chat response system 112 identifies content terms within the digital content body 116. As used herein, a "content term" refers to a word, sentence, phrase, paragraph, or other group of words. In one or more embodiments, a content term is a word, sentence, phrase, paragraph, or group of words that carries significance, e.g., that provides contextual meaning within the digital content body 116 (e.g., within a content portion). To illustrate, a content term can refer to a word that the chat response system 112 determines to be a key term within its contextual surroundings. As another example, a content term can refer to a detected section heading or title within the digital content body 116.

In addition, a content term can be a term that corresponds to a content topic within the digital content body. Indeed, in some instances, a content term can directly define a content topic, e.g., the content term is the same as the content topic. Indeed, the chat response system 112 identifies content terms as defining, relating to, and/or belonging to a particular content topic. Upon identifying content terms, the chat response system 112 identifies content topics as relating to certain content terms. In addition, content terms are associated with certain content portions. Accordingly, the chat response system 112 can determine whether a given content portion corresponds to a given content topic based on matching content terms from the content portion with those content terms that are indicative of the given content topic.

As will be described in detail below, based on relationships between content topics, content portions, and content terms, the chat response system 112 can generate a language model to use in generating and providing a response to a chat question from a user, as shown by act 208 of FIG. 2. In particular, the chat response system 112 generates a language model that includes relational rules between content terms. As described above, the chat response system 112 identifies content terms throughout the digital content body 116 and associates the content terms to content topics. In addition to this, the chat response system 112 determines relational rules between content terms identified throughout the digital content body 116.

As used herein, a relational rule refers to a relationship, connection, correlation, degree of similarity, or other association that defines how two content terms relate to each other. That is to say, a relational rule designates a link between two or more content terms based on a number of factors. For example, a relational rule between two words can include a consideration of a frequency of how often the two words are used together. Additionally, a relational rule can include a determination of how two words are used together in a sentence (e.g., the order of the words, the degree of separation of the words, the physical distance between the words, which component of the sentence each word makes up, etc.). Furthermore, a relational rule can include a linguistic analysis (e.g., a corpus linguistics analysis) of the identified content terms within the digital content body 116 to determine how each word is used (commonly, technically, or otherwise) in a given language, a given context, etc.

Accordingly, the chat response system 112 determines relational rules among the identified content terms throughout the digital content body 116. In particular, the chat response system 112 determines how the content terms are related (e.g., according to one or more of the factors described above), and defines relational rules to describe those relationships. Thus, the chat response system 112 generates a language model to map the relationships of each identified content term to every other identified content term throughout the digital content body 116.

For example, the chat response system 112 implements a word-to-vector algorithm such as, for example, Word2Vec. In particular, the chat response system 112 converts each identified content term into a vector representation. In other words, the chat response system 112, by implementing a word-to-vector algorithm, creates vectors that are distributed numerical representations of word features such as, for example, the context (e.g., surrounding words, interpolated meaning of words, etc.) of individual words (e.g., content terms). Additionally, the chat response system 112 maps each vector to determine how each vector relates to other vectors.

To illustrate, in some embodiments, the word-to-vector (e.g., Word2Vec) method uses a two-layer neural network that analyzes words (e.g., content terms) as discrete states and looks for transitional probabilities between those states—i.e., the likelihood that a given transition will occur. Thus, given enough data (e.g., a corpus or digital content body 116), word usage information, contextual information, and by implementing the word-to-vector algorithm, the chat response system 112 makes highly accurate approximations of the meaning of a word (e.g., content term) based on past appearances within a corpus such as the digital content body 116.

The chat response system 112 uses such approximations to establish a content term's association with other content terms (e.g., "man" is to "boy" as "woman" is to "girl"). Additionally, the chat response system 112 uses the approximations to cluster content portions and classify them by content topic. To illustrate, the chat response system 112 measures a cosine similarity between content terms. Particularly, two content terms that have no similarity are expressed as having a 90-degree angle between them, while total similarity (e.g., as with words that are the exact same) is expressed as having a 0-degree angle. Accordingly, the chat response system 112 determines a cosine similarity (or other similarity) between each content term and every other content term. Additional detail regarding the language model and how the chat response system 112 generates the language model is provided below with regard to FIG. 3.

Although not illustrated in FIG. 2, the chat response system 112 uses language model generated in act 208 to generate and provide responses to chat messages received from users. In general, and as will be described in greater detail below with respect to an updated language model, the chat response system 112 detects key words within a chat message, and using the language model, identifies one or more content terms that correspond with the key words from the chat message. Upon identifying content terms that correspond with the chat message, the chat response system 112 determines one or more content topics associated with the content terms, and then provides one or more content portions associated with the determined content topics. The details of generating and providing a response using the language model (e.g., the first language model) is the same as the process described below with respect to generating and providing a response using an updated language model (see acts 214-220).

As further illustrated in FIG. 2, the digital content provider 114 changes (e.g., updates) the digital content body 116, as shown by act 210. As used herein, the term "change" when used in combination with digital content, content portion, and digital content body, refers to an alteration, addition, deletion, or other modification made to digital content. In some embodiments, for example, an individual such as a website administrator or other document manager associated with the digital content provider 114 can change the digital content body 116 by editing the digital content body. Accordingly, for example, the digital content provider 114 adds, removes (e.g., deletes), alters, or otherwise modifies the content within the digital content body 116. For example, in some examples, the digital content provider 114 adds one or more words, sentences, paragraphs, or other sections of content to the digital content body 116. In the same or other examples, the digital content provider 114 deletes or otherwise changes one or more sections of content from the digital content body 116.

To illustrate, the digital content provider 114 changes, within the digital content body 116, a product description and/or instructions relating to a service offered by the digital content provider 114. By changing the digital content body 116, in some embodiments, the digital content provider 114 creates a new digital (e.g., changed) digital content body. Additional detail regarding the creation of the changed digital content body (e.g., changing the digital content body 116) is provided below with reference to FIG. 4.

Continuing the sequence flow diagram 200 of FIG. 2, the chat response system 112 monitors the digital content body 116 to detect a change in the digital content body 116, as shown by act 212. In particular, the chat response system 112 monitors the digital content body 116 by setting a trigger to detect whenever the digital content provider 114 or other individual or entity opens or otherwise accesses the digital content body 116. Additionally or alternatively, the chat response system 112 monitors the digital content body 116 to detect an input from the digital content provider 114 or other entity. Thus, by detecting an input, the chat response system 112 triggers whenever the digital content provider 114 or other entity makes a change to the digital content body 116.

In the same or other embodiments, the chat response system 112 iteratively checks the digital content body 116 for any changes made therein. In particular, the chat response system 112 performs an analysis of the digital content body 116 on a periodic (e.g., regular, timer-interval) basis. Additionally or alternatively, the chat response system 112 detects a change in the digital content body 116 by analyzing the digital content body 116 and comparing the digital content body to the previous (e.g., unchanged) digital content body 116. In other words, the chat response system 112 compares different versions of the digital content body 116 to determine whether there are differences between them.

When the chat response system 112 identifies a difference, the chat response system 112 updates the language model, as shown by act 214 of FIG. 2. In particular, the chat response system 112 updates the language model by re-determining the relational rules between the content terms identified within the digital content body 116. In other words, the chat response system reanalyzes the digital content body 116 to identify content terms, content portions, and/or content topics therein. Due to the changes of the digital content body 116, the chat response system 112 identifies new content terms, modified content terms, new content portions, modified content portions, new content topics, and/or modified content topics.

In some embodiments, the chat response system 112 updates the language model by regenerating the language model—i.e., by generating an updated language model. To illustrate, upon identifying new content terms, the chat response system 112 implements, using the newly identified content terms, the word-to-vector algorithm as described above. In particular, the chat response system 112 models each identified content term as a vector and further determines the numerical (e.g., angular) cosine similarity between the content terms, including any new or changed content terms. Thus, the chat response system 112 updates the relational rules of the language model by generating an updated language model based on the changed digital content body 116.

The chat response system 112 uses the updated language model to provide responses to a user-provided chat message (referred to herein as either a chat message or chat question). For instance, and referring again to the sequence flow diagram 200 of FIG. 2, a user (e.g., user 102 from FIG. 1) submits a chat message, as shown by act 216. In particular, the user 102 enters (e.g., types or otherwise inputs) a chat question by interacting with a user interface of the chat application 106 running on the user client device 104. For example, the user 102 inputs an inquiry about a new product or service offered by the digital content provider 114 that the client device 104 sends to the chat response system 112. Accordingly, as used herein, the term chat question is a chat message that includes a question.

With that said, a chat question does not necessarily need to be formulated as a question, rather, a user can simply input text related to the user's interest. For example, a user may create a chat message that includes the text, "What is the price of service X?" However, another user may simply create a chat message that includes the text, "Price of X." Both chat messages will likely result in the same or similar response from the chat response system 112. Indeed, in response to receiving the chat question, the chat response system 112 categorizes the chat question, as shown by act 218 of FIG. 2. In particular, the chat response system 112 analyzes the chat question to identify keywords within the chat question. For example, the chat response system 112 parses text within the chat question to identify significant words that can be used to infer a meaning of the chat question. In other words, the chat response system 112 identifies words within the chat question that convey a subject of the chat question.

Using the identified keywords within the chat question, the chat response system 112 categorizes the chat question received from the user device 104 by identifying one or more content topics that are relevant to the chat question. In particular, the chat response system 112 determines a relevance to the chat question of each of the identified content topics by implementing a word distance algorithm (e.g., Word Mover's Distance or "WMD"). In other words, the chat response system 112 determines, based on the vector representations of each content term and chat question keyword, a location of each content term and chat question keyword within a numerical space. Furthermore, the chat response system 112 determines a distance between each chat question keyword and each content term (or between each chat question as represented by its group of keywords and each content topic as represented by its associated content terms) to determine a relevance between the content term and chat question keyword. Additional detail regarding the WMD algorithm is provided below with reference to FIG. 6.

Accordingly, the chat response system 112 uses the language model described above to extrapolate, from the keywords of the chat question, which identified content topics are applicable (e.g., related, relevant, etc.) to the chat question. Particularly, the chat response system 112 implements a WMD algorithm to determine a distance between a numerical representation of the chat question and each content topic, where the shortest distance between content topic and chat question denotes the highest degree of relevance.

In one or more embodiments, the chat response system 112 identifies more than one content topics as relevant to the chat question. For example, the chat response system 112 determines threshold relevance that the chat response system 112 uses to identify relevant content topics. That is to say, the chat response system 112 identifies those content topics that meet, exceed, or otherwise satisfy the relevance threshold as content topics that are relevant to the chat question. In these or other embodiments, the chat response system 112 bases the relevance determination on the distance of the content topic from the chat question according to the WMD algorithm. Thus, a shorter distance between a content topic and the chat question results in a higher relevance. Accordingly, the chat response system 112 can, in some embodiments, use a distance threshold to identify those content topics that are within a certain distance of the chat question and are therefore relevant (e.g., satisfy the relevance threshold). On the other hand, the chat response system 112 can use a distance threshold to identify those content topics that are outside a certain distance of the chat question and are therefore irrelevant. Additional detail regarding the application of the language model as pertaining to the keywords of the chat question is provided below, with reference to FIGS. 5 and 6.

Upon identifying a relevant content topic, the chat response system 112 generates and provides a response to the chat question to the user 102 by way of the user client device 104, as shown by act 220 illustrated in FIG. 2. In particular, based on an identified relevant content topic, the chat response system 112 provides a response from digital content related to that content topic. Specifically, the chat response system 112 identifies a content portion associated with the relevant content topic, and provides that content portion to the user client device 104 in a chat message as a response to the user's chat question.

Put another way, since each content topic pertains to one or more content portions of the digital content body 116, the chat response system 112 identifies at least a part of the one or more content portions associated with a relevant content topic as a response. The chat response system 112 then provides that response as a message by way of the chat application 106 on the user client device 104. For instance, the chat response system 112 provides the response as an instant message or other digital chat message by way of network 108 in accordance with proper electronic communication protocol.

In some cases, the chat response system can provide an entire content portion that is associated with a content topic that is relevant to a chat question. In other cases, the chat response system 112 does not provide an entire content portion as a response. Rather, in some embodiments, the chat response system 112 determines which parts of text, images, or other content are most pertinent or relevant (e.g., would be most helpful in answering the chat question) and provides those most pertinent parts of a content portion as a response.

In the same or other embodiments, the chat response system 112 generates a natural language response to the chat question. In particular, the chat response system 112 analyzes the text of the relevant content portion (e.g., the content portion that the chat response system 112 determines is relevant to the chat question, as described above) and generates a natural language version of the content portion. In some embodiments, the natural language response is one or more excerpts from the relevant content portion, while in other embodiments the natural language response is textually different from the content portion while still conveying the same meaning. For example, in cases where the relevant content portion is complex, technical, or otherwise difficult for an average user to understand, the chat response system 112 uses a natural language processing technique to reword the relevant content portion using terms and grammatical structure that is more effective in conveying the meaning of the relevant content portion. In this way, the chat response system 112 generates and provides a shorter and easier to understand response to the user 102.

Additionally or alternatively, the chat response system 112 provides a response as an amalgam of content from more than one content portion of the digital content body 116. In particular, the chat response system 112 determines, from the keywords of the chat question, which content portions of the digital content body 116 are relevant (e.g., as described above), and, in cases where more than one content portion is relevant, provides pieces of each of the relevant content portions. Thus, rather than providing every relevant content portion in its entirety, in some embodiments, the chat response system 112 determines what part or parts of each relevant content portion is most pertinent (e.g., relevant, helpful, on-point, etc.) to the chat question and provides those parts as snippets in a response, combines the relevant portions, or sends each relevant portion in separate chat messages.

Though not illustrated in FIG. 2, the chat response system 112 further analyzes a chat history associated with the user 102. In particular, the user client device 104 and/or the chat response system 112 can maintain a history of previous chat conversations held between the user client device 104 and the chat response system 112. For example, the user 102, or other users, can have had previous questions about a product or service offered by the digital content provider 114, and can have inquired the chat response system 112 about certain information in the past. Thus, the chat response system 112 can access and analyze the chat history of user(s) to further identify relevant content topics and content portions.

In analyzing the chat history, the chat response system 112 identifies chat terms used in previous conversations, and uses the identified chat terms as part of generating the language model described above. In other words, the chat response system 112 applies a word-to-vector technique to the chat terms and the content terms identified from the digital content body 116. In this way, the chat response system 112 determines relational rules, not only between different content terms, but also between chat terms and content terms. Accordingly, the chat terms inform the chat response system 112 of relationships between chat terms and content terms in a user-specific way to more accurately provide a response to the user 102.

To illustrate, the user 102 may use different vernacular (e.g., word choice) compared to the terminology of the digital content body 116. By analyzing both the chat history as well as the digital content body 116 in generating the language model, the chat response system 112 determines relational rules between the vernacular used by users (e.g., the chat terms) and the terminology of the digital content body 116 (e.g., the content terms). Accordingly, the chat response system 112 effectively determines content topics are most applicable to a chat question based on connections between chat terms and content terms using the techniques described above (e.g., word-to-vector algorithm).

Additionally, the chat response system 112 updates the chat history associated with a particular user (e.g., user 102), or group of users, by adding a new entry to the chat history after each interaction (e.g., chat question) or after each chat session. In particular, in response to receiving a chat question or other chat-based interaction from the user client device 104, the chat response system 112 updates the chat history with a new entry and reanalyzes the chat history according to the techniques described herein.

Figure 3:
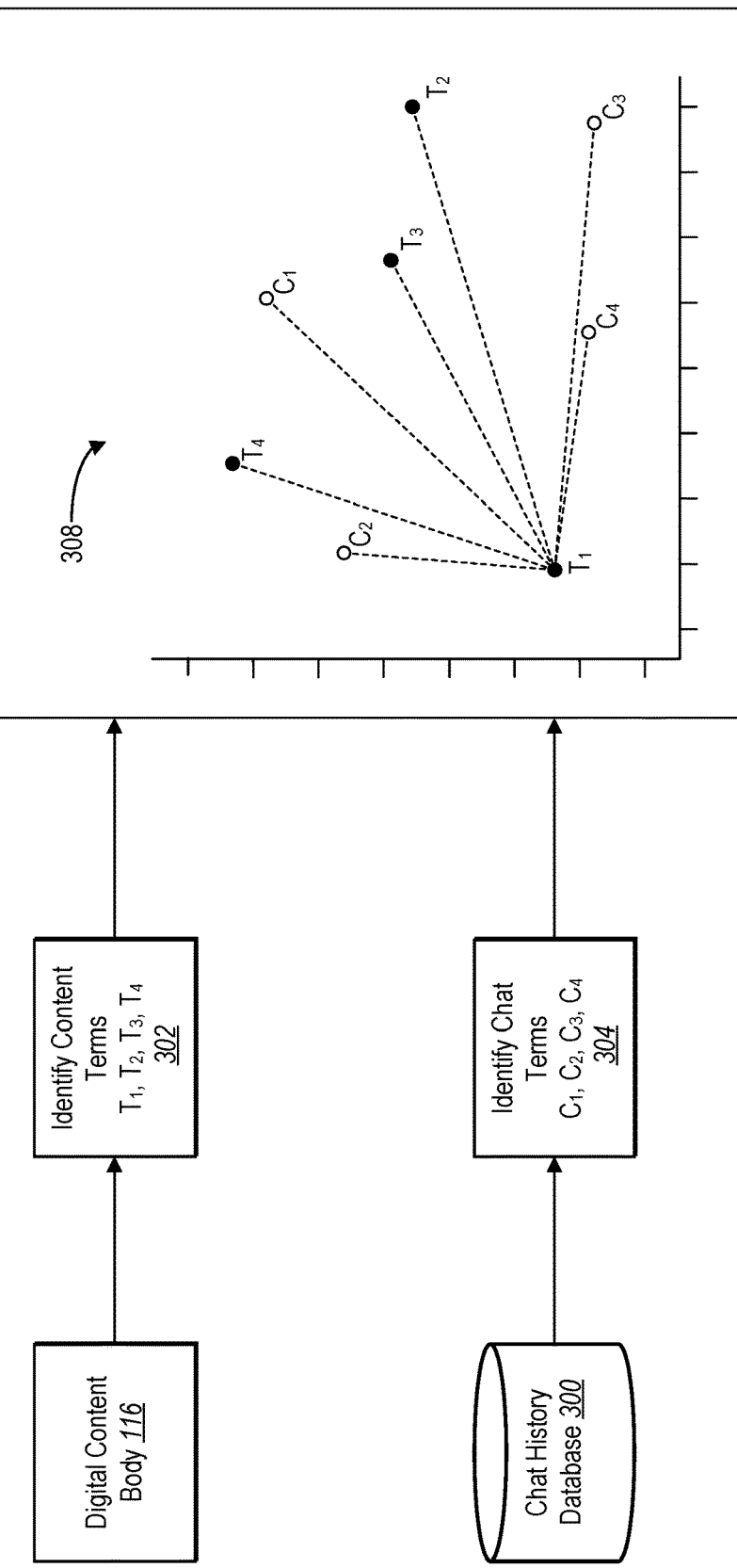
FIG. 3 illustrates an example process for generating a language model in accordance with one or more embodiments.

Referring now to FIG. 3, an example process of generating a language model 308 is shown. In particular, FIG. 3 illustrates the process including various acts 302, 304, and 306. For example, FIG. 3 illustrates an act 302 including analyzing an example digital content body 116 to identify content terms T1, T2, T3, and T4. The chat response system 112 analyzes the digital content body 116 as described above by implementing a textual analysis technique to determine which words within the digital content body 116 are significant (e.g., words that convey meaning such as nouns and verbs), and which words are relatively insignificant. For example, the chat response system 112 performs a natural language processing technique on the digital content body 116 to identify the content terms. The content terms T1, T2, T3, and T4 can relate to a single content topic or else can relate to different content topics.

As also illustrated in FIG. 3, the process includes act 304 of identifying chat terms C1, C2, C3, and C4. In particular, the chat response system 112 analyzes a chat history database 300 maintained by the chat response system 112 and/or the user client device 104. As described above, the chat history database 300 includes previous chat submissions/interactions associated with the user 102. Thus, the chat response system 112 identifies chat terms C1, C2, C3, and C4 from within the chat history by implementing a natural language processing technique as discussed above with relation to the digital content body 116.

As shown by act 306 of FIG. 3, the chat response system 112 generates a language model 308 based on the identified content terms T1, T2, T3, and T4 and the identified chat terms C1, C2, C3, and C4. Particularly, the chat response system implements a word-to-vector algorithm to determine how each term (e.g., content term and/or chat term) relates to each other term. For example, in some embodiments, the chat response system 112 implements a word embedding model such as the Word2Vec model described in the paper, Mikolov, T., Sutskever, I., Chen, K., Corrado, G., & Dean, J., "Distributed Representations of Words and Phrases and their Compositionality." Proc. Advances in Neural Information Processing Systems 26, 3111-3119 (2013), which is incorporated by reference herein in its entirety. In the same or other embodiments, the chat response system 112 implements a Continuous Bag of Words ("CBOW") Word2Vec model or else implements a skip-gram Word2Vec model. In still other embodiments, the chat response system 112 can implement a different word embedding model such as GloVe, C&W, or other model.

Thus, as illustrated in FIG. 3, the chat response system 112 generates a language model 308 to express the content terms T1, T2, T3, and T4 and chat terms C1, C2, C3, and C4 in a model space (e.g., Word2Vec space). For example, the chat response system 112 expresses each term as a vector in a vector space. The chat response system 112 thereafter calculates the similarity between each term such as, for example, a cosine similarity expressed as an angle between the vector representations of each term.

As also mentioned, the chat response system 112 implements a WMD algorithm to determine the similarity of each term to each other term. In particular, the chat response system 112 implements the WMD algorithm from, for example, the paper, Kusner, M., Sun, Y., Kolkin, N. I., Weinberger, K. Q., "From Word Embeddings to Document Distances," Proceedings of ICML (2015). By using the WMD algorithm, the chat response system 112 takes advantage of the Word2Vec space representation of each content term T1, T2, T3, and T4 and each chat term C1, C2, C3, and C4 to then calculate a distance (e.g., Euclidean distance) between each term. The distance between terms represents a degree of similarity between those terms, where shorter distances indicate a higher degree of similarity.

Thus, looking to a representation of the language model 308 of FIG. 3, the chat response system 112 models the content terms T1, T2, T3, and T4 and chat terms C1, C2, C3, and C4 as, for example, points within a coordinate system. As also illustrated in FIG. 3, the content term T1 is shown with plotted distance calculations to each other content term and chat term. As such, the chat response system 112 determines a relational rule between T1 and each of the other identified content terms as well as the chat terms. Accordingly, the generated language model 308 is an example illustration of a WMD representation of the relationships between T1 and other identified content terms T2, T3, and T4 and chat terms C1, C2, C3, and C4.

While FIG. 3 illustrates the distance relationships between T1 as compared to each of the other terms, the chat response system 112 also calculates a distance between T2 and every other term, T3 and every other term, and so on for each identified content term as well as for each identified chat term. Thus, the chat response system 112 determines relational rules from each term to every other term within the language model 308 (or to a subset of terms within the language model 308). Additionally, in one or more embodiments, the chat response system 112 determines relational rules between a term and a group of two or more terms. For example, in these embodiments, the chat response system 112 considers a group of two or more terms as a single plot point within a model space and determines a relationship between the group of terms and other content terms and/or chat terms, using the techniques described above.

Note, although FIG. 3 shows an example embodiment that utilizes both content terms and chat terms, in some embodiments, the chat response system 112 uses solely content terms identified within the digital content body 116. In other embodiments, the chat response system 112 uses only content terms from the digital content body 116 until a threshold amount of chat messages are received with respect to a particular digital content body 116. Regardless, it is noted that the chat response system 112 does not necessarily analyze chat histories to generate the language model 306.

Figure 4:
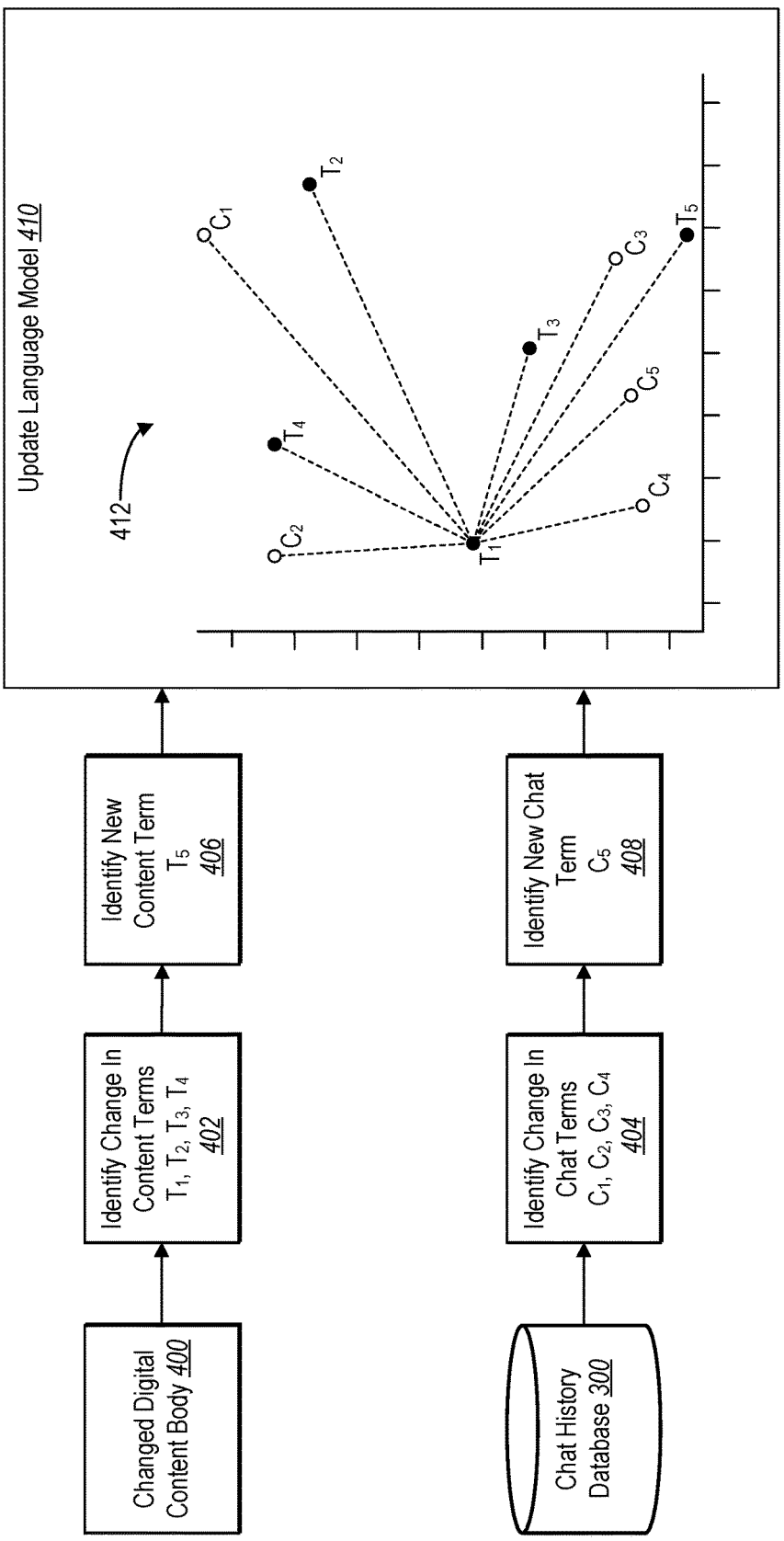
FIG. 4 illustrates an example process for generating an updated language model in accordance with one or more embodiments.

FIG. 4 illustrates a process for updating the language model 308 as described above. In particular, FIG. 4 illustrates a process for generating an updated language model 412. As shown in FIG. 4, the process includes an act 402 of identifying a change in content terms T1, T2, T3, and T4. In particular, the act 402 includes monitoring the digital content body 116 to detect a change made to the digital content body 116. For example, a user associated with the digital content provider 114 changes a product description within the digital content body 116, and as a result, the chat response system 112 makes changes to the relational rules between content terms due to the modified digital content body 116.

As illustrated in FIG. 4, the process of updating the language model 308 (e.g., generating the updated language model 412) includes an act 406 of identifying a new content term T5. For example, in some cases, the changed digital content body 116 includes a description of a new product or service within the digital content body 114. Accordingly, in such a case, the chat response system 112 detects an addition of digital content to the digital content body 116, and additionally detects a new content term T5 that did not previously exist within the digital content body 116.

Although not illustrated in FIG. 4, in some embodiments, the chat response system 112 detects a deletion from the digital content body 116 that results in the removal of one or more previously identified content terms.

As also illustrated in FIG. 4, the process of generating the updated language model 412 includes an act 404 of identifying a change in the chat terms $C_1$, $C_2$, $C_3$, and $C_4$. Similar to the discussion above, the chat response system 112 monitors the chat history database 300 associated with the user 102 to detect any new entries added to the chat history, any changes to the chat history, or any deletions from the chat history. Thus, the chat response system 112 detects a change in the identified chat terms $C_1$, $C_2$, $C_3$, and $C_4$ from the chat history database 300. For example, and as illustrated in FIG. 4, the process of generating the updated language model 412 includes an act 408 of identifying a new chat term $C_5$. Upon detecting the addition of a new entry to the chat history database 300, the chat response system 112 identifies a new chat term $C_5$ added to the chat history that was not included in the previous chat interactions between the user(s) and the chat response system 112.

The process illustrated in FIG. 4 further includes an act 410 of updating the language model 308 to generate the updated language model 412. In particular, upon detecting the changes to the content terms $T_1$, $T_2$, $T_3$, and $T_4$, the changes to the chat terms $C_1$, $C_2$, $C_3$, and $C_4$, the addition of the content term $T_5$, and/or the addition of the chat term $C_5$, the chat response system 112 updates the language model 308 by generating an updated language model 412. As shown in FIG. 4, the updated language model 412 includes modified relational rules between the identified content terms $T_1$, $T_2$, $T_3$, $T_4$, and $T_5$ and the identified chat terms $C_1$, $C_2$, $C_3$, $C_4$, and $C_5$. In particular, the updated language model 412 includes different relational rules than the language model 308 of FIG. 3, as shown by the distances between the identified content terms and the identified chat terms.

Figure 5:
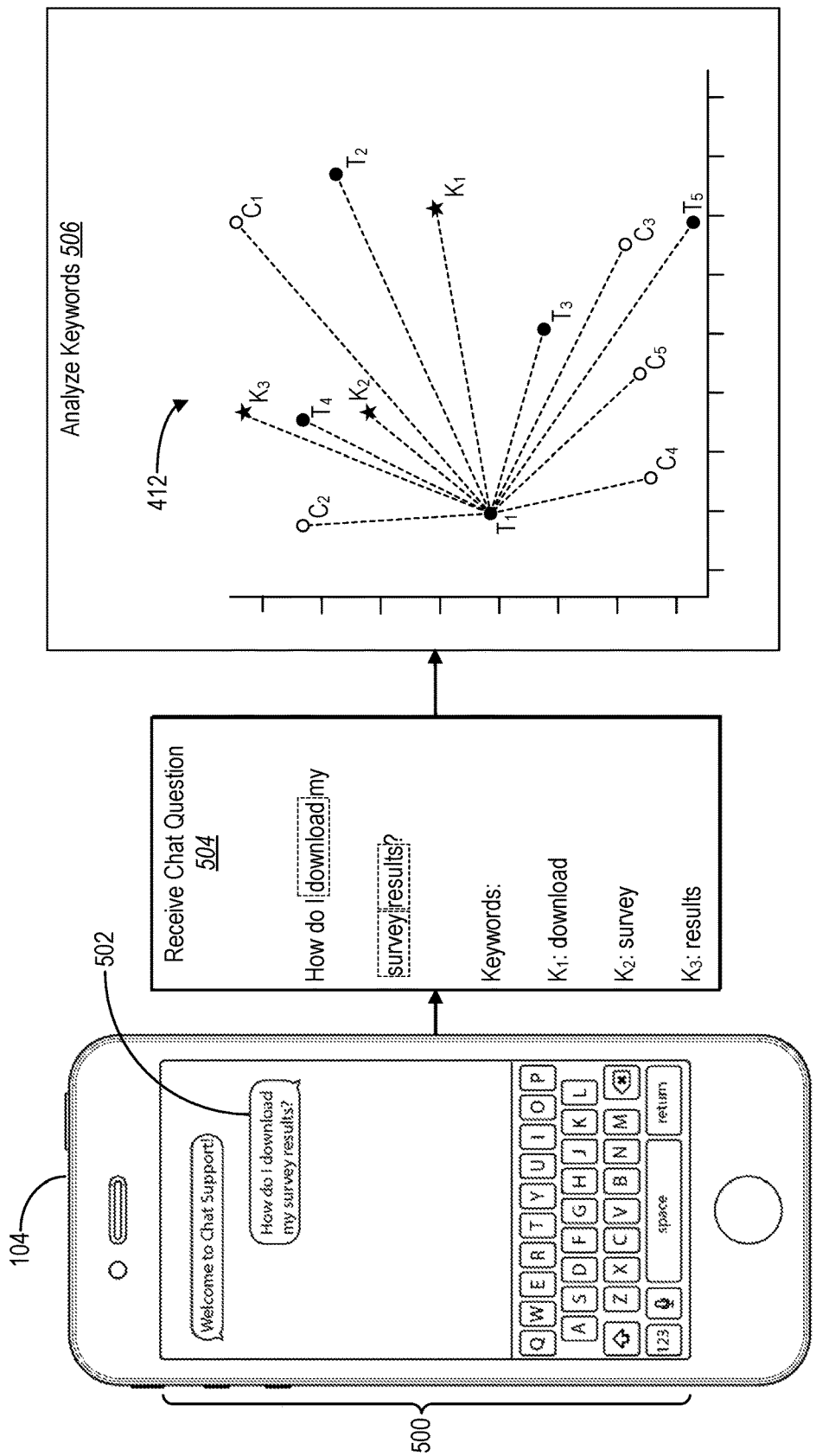
FIG. 5 illustrates an example process for receiving and analyzing a chat question in accordance with one or more embodiments.

FIG. 5 illustrates the user client device 104 including a user interface 500 that presents a chat interface including the chat question 502. In particular, the user client device 104 runs a chat application (e.g., chat application 106) to present, to the user 102, a chat interface by which the user 102 interacts with the chat response system 112. For example, the user 102 inputs and submits, by way of a keyboard, touchpad, or other input device, a chat question 502, "How do I download my survey results?" Although FIG. 5 illustrates a chat question 502 including a single sentence with correct spelling and grammar, in some examples, the user 102 enters a chat question including multiple sentences, run-on sentences, misspelled words, incorrect grammar, and/or other colloquial or common text-messaging communication forms (e.g., acronyms such as "R" for "are", "y" for "why,", "btw" for "by the way," etc.). In any case, the chat response system 112, identifies keywords within the chat question, as described above.

Accordingly, FIG. 5 illustrates an act 504 of receiving the chat question 502, including analyzing the chat question 502 to identify keywords therein. In particular, the chat response system 112 identifies three keywords, "download," "survey," and "results," within the chat question 502. Thus, as shown in FIG. 5, the chat response system 112 identifies the keywords from the chat question 502 as $K_1$, $K_2$, and $K_3$, respectively. Similar to the discussion above, the chat response system 112 identifies the keywords $K_1$, $K_2$, and $K_3$ by analyzing the chat question 502 according to natural language processing techniques to determine which words within the chat question 502 carry significance to convey the meaning of the chat question 502. Thus, the chat response system 112 identifies those more meaningful words within the chat question 502 as keywords (e.g., "download," "survey," and "results") and identifies those less meaningful words as non-keywords (e.g., "How," "do," "I," and "my").

FIG. 5 further illustrates an act 506 of analyzing the keywords identified within the chat question 502. In particular, the chat response system 112 implements, using the keywords from the chat question 502, the word-to-vector method and/or the WMD method described above. As shown in FIG. 5, the chat response system 112 analyzes the keywords $K_1$, $K_2$, and $K_3$ according to the updated language model 412 of FIG. 4. The updated language model 412 shown in FIG. 5 is structurally and functionally the same model as the updated language model 412 of FIG. 4, but with a mapping of the keywords $K_1$, $K_2$, and $K_3$ within the same model space of the WMD method described above with reference to FIG. 4.

Accordingly, as shown in FIG. 5, the updated language model 412 depicts the distance relationships between $T_1$ and each other term (e.g., content terms, chat terms, and keywords). Though not illustrated, the chat response system 112 also determines the distance relationship between each term and every other term shown within the updated language model 412 of FIG. 5. The chat response system 112 thereby builds a mathematical mapping of relational rules between content terms from the digital content body 116 and/or chat terms from the chat history database 300, and keywords from the chat question 502.

Figure 6:
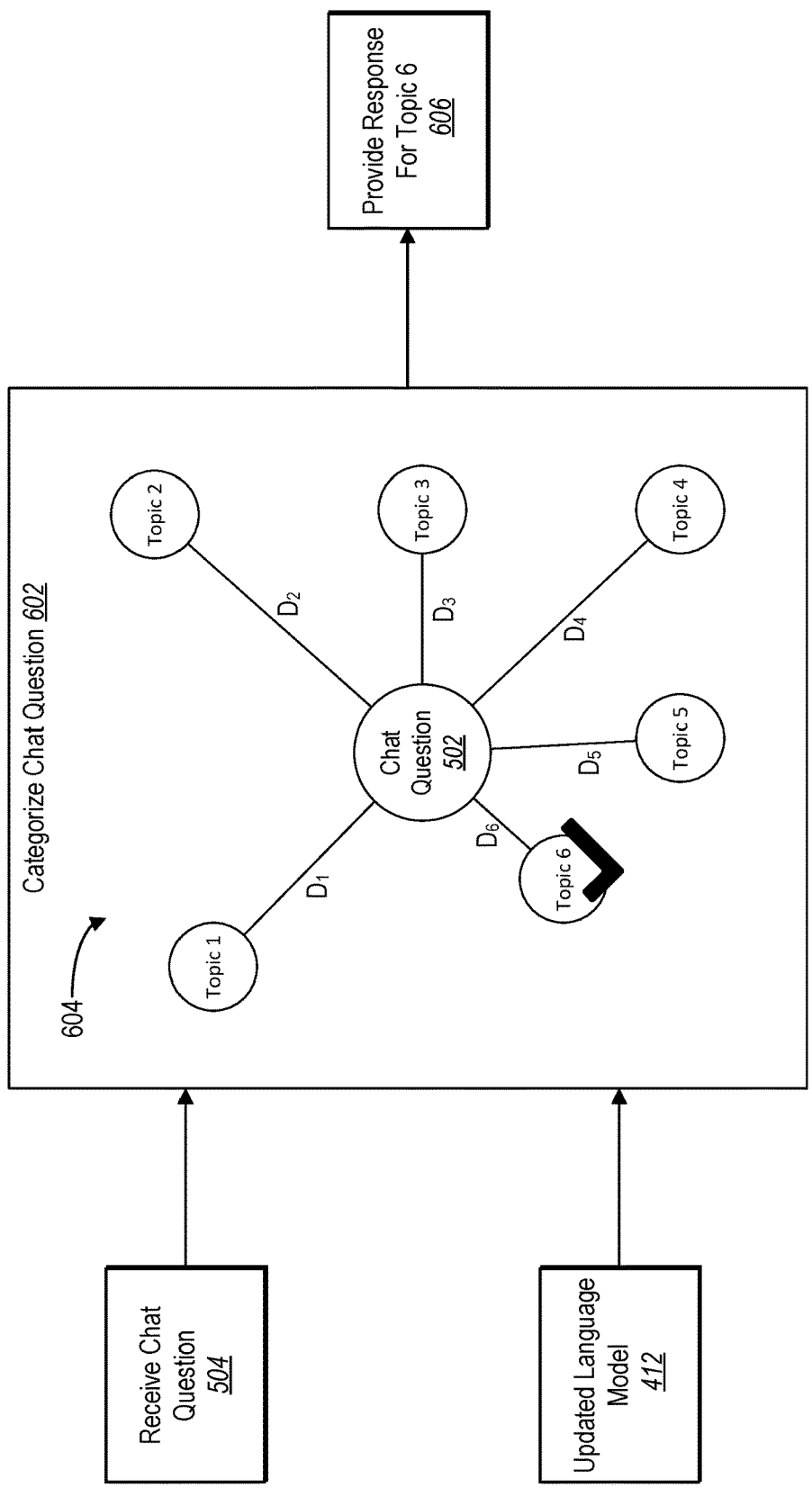
FIG. 6 illustrates an example process of categorizing a chat question in accordance with one or more embodiments.

FIG. 6 illustrates a process by which the chat response system 112 provides a response to the chat question 502. In particular, the process includes the act 504 of FIG. 5 of receiving the chat question. The chat response system 112 receives the chat question 502 and analyzes the chat question according to the discussion above with reference to FIG. 5. For example, the chat response system 112 identifies keywords with the chat question 502 and determines how the keywords relate to content terms from the digital content body 116 and/or the chat history kept in the chat history database 300 based on the updated language model.

As further illustrated in FIG. 6, the process by which the chat response system 112 generates and provides a response the chat question 502 includes an act 602 of categorizing the chat question. In particular, the chat response system 112 determines which content topic(s) are relevant to the chat question 502. To do so, the chat response system 112 performs the analyses described with respect to FIGS. 4 and 5 for each keyword identified within the chat question 502 (e.g., keywords $K_1$, $K_2$, and $K_3$).

In some embodiments, for example, the chat response system 112 treats the grouping of keywords $K_1$, $K_2$, and $K_3$ from the chat question 502 as a single entity and further treats content terms corresponding to a particular content topic as a single entity. By grouping content terms into content topics and by grouping keywords together into keyword groups, the chat response system 112 determines relationships between the keyword groups and the content topics. For instance, in one or more embodiments, the chat response system 112 considers the word-based analysis described above in a compound sense to make an aggregate analysis of chat questions as a whole.

To illustrate, the chat response system 112 evaluates the content terms and chat terms related to keyword $K_1$, the content terms and chat terms related to keyword $K_2$, and the content terms related to keyword $K_3$. In some cases, the content terms related to each of keywords $K_1$, $K_2$, and $K_3$ will be related in the same way, but in other cases, the content terms will be related in different ways. Indeed, the chat response system 112 can identify different content terms as related to $K_1$ than are related to $K_2$. Accordingly, the chat response system 112 determines, in these cases, that $K_1$ and $K_2$ are related to different content topics.

As such, by considering the keyword grouping of keywords $K_1$, $K_2$, and $K_3$ together, the chat response system 112 identifies, in some embodiments, multiple content topics as content topics related to the chat question 502. Additionally, based on the analysis described above, the chat response system 112 determines varying degrees of similarity between the chat question 502 and various content topics, according the updated language model 412.

To illustrate from FIG. 6, the relationship map 604 depicts the chat question 502 relating to six different content topics, Topic 1, Topic 2, Topic 3, Topic 4, Topic 5, and Topic 6. Each of Topics 1-6 include content terms related to the respective content topic just like chat question 502 includes keywords $K_1$, $K_2$, and $K_3$. Additionally, the chat response system 112 determines distances between the chat question 502 and each of the content topics based on the chat question keywords and the contents terms within each respective topic group. Indeed, as shown in FIG. 6, the chat response system 112 determines a distance $D_1$ between the chat question 502 and Topic 1. Likewise, the chat response system 112 determines the distances $D_2$, $D_3$, $D_4$, $D_5$, and $D_6$.

As illustrated in FIG. 6, the chat response system 112 determines $D_6$ as the shortest distance. Therefore, the chat response system 112 identifies Topic 6 as the most relevant content topic to the chat question 502, as shown by act 606. Although FIG. 6 depicts a single content topic as the relevant content topic, in some embodiments, the chat response system 112 identifies more than one content topic as relevant, and therefore provides a response corresponding to more than one content portion or more than one content topic (e.g., where a single content portion relates to multiple content topics). In such a case, the chat response system 112 can send a chat message that asks the user to indicate which of the two relevant topics the user is most interested.

As illustrated in FIG. 6, the chat response system 112 provides a response to the chat question 502 by sending (e.g., transmitting) text or other content from a content portion corresponding to Topic 6 to the user client device 104. As discussed above, in some embodiments, the chat response system 112 provides an entire content portion as a response, while in other embodiments the chat response system 112 provides a portion of one or more content portions or else provides a natural language response. In any case, upon determining which content topic is relevant to the chat question 502, the chat response system 112 provides a response to the chat question 502 to display via the user interface 500 of the user client device 104.

Figure 7:
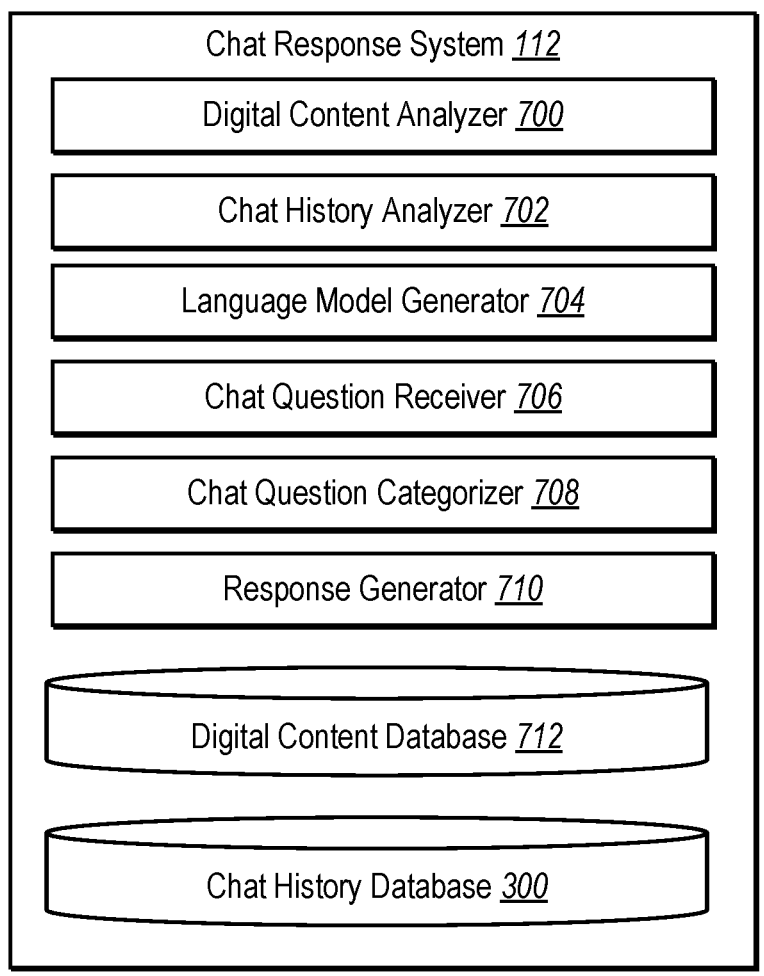
FIG. 7 illustrates a schematic diagram of a chat response system in accordance with one or more embodiments.

FIG. 7 illustrates a schematic diagram of an example chat response system 112. The chat response system 112 can be an example embodiment of the chat response system 112 as described above. Further, the chat response system 112 can be executed on a customer support system over the web, mobile devices, or other platforms implementing appropriate technologies for transmitting digital communication information.

As shown in FIG. 7, the chat response system 112 can include various components such as the digital content analyzer 700, the chat history analyzer 702, the language model generator 704, the chat question receiver 706, the chat question categorizer 708, the response generator 710, the digital content database 712, and the chat history database 300 (e.g., the chat history database described above with reference to FIG. 3).

The digital content analyzer 700 can analyze digital content. In particular, the digital content analyzer 700 can analyze a digital content body (e.g., digital content body 116) such as a text document, a webpage (e.g., a customer support page), a PDF, or other body of digital content. The digital content analyzer 700 can analyze digital content by parsing text to delineate between words, sentences, paragraphs, and to identify different text attributes from within a content body. For example, the digital content analyzer 700 can identify a title or heading apart from a contiguous text section, as described in detail above.

The digital content analyzer 700 can communicate with the digital content database 712 to analyze the digital content body stored within the digital content database. In particular, the digital content database 712 maintains one or more bodies of digital content. For instance, the digital content database stores digital content therein such as webpages, documents, images, and other items of digital content. Accordingly, the digital content analyzer 700 analyzes a digital content body stored within the digital content database 712, as described above.

Furthermore, the digital content analyzer 700 can monitor the digital content database 712 for changes made to the digital content portion stored therein. In particular, the digital content analyzer 700 detects any changes made to one or more portions of content within the digital content database 712. The digital content analyzer 700 reanalyzes the digital content body upon detecting a change made to the digital content therein. Accordingly, the digital content analyzer 700 communicates with the language model generator 704 to generate and/or update the language described herein.

Moreover, the digital content analyzer 700 can identify key portions of text or other content. In particular, the digital content analyzer 700 can implement a natural language processing technique to identify terms that are more significant or that give particular meaning to a sentence. For instance, the digital content analyzer 700 analyzes the digital content body to identify content terms within various content portions throughout the digital content body.

The digital content analyzer 700 communicates with the language model generator 704. In particular, the language model generator 704 can generate the language model described above. The language model generator 704 implements the word-to-vector technique described above, as well as the WMD algorithm to determine word-to-word, sentence-to-sentence, and/or document-to-document relationships between two or more bodies of digital content. The language model generator 704 maps the relational rules between the content terms identified within the digital content body, as described herein.

The chat history analyzer 702 similarly analyzes digital content, but in the context of previous chats associated with a particular user. In particular, the chat history analyzer 702 identifies chat terms used throughout a user's chat history to discern how a particular user refers to products, policies, services, etc. associated with a digital content provider (e.g., digital content provider 114). The chat history analyzer 702 thus learns how a user communicates and learns a vernacular that the user frequently utilizes in conversation.

For instance, the chat history analyzer 702 communicates with the chat history database 300 to access a chat history associated with a user. As described above, the chat history analyzer communicates via a network (e.g., network 108) to identify a chat history associated with a particular user, and analyzes the identified chat history for chat terms to gain an understanding of the particular user's word choice as part of the predictive language model.

The chat history analyzer 702 also monitors the chat history database 300 to detect any changes made to the chat history. For instance, the chat history analyzer 702 detects the addition of a new entry to the chat history associated with a particular user upon the conclusion of a chat conversation in which the user has taken part. The chat history analyzer 702 thus communicates with the language model generator 704 to generate and/or update the language model in accordance with modifications necessitated by the changes to chat terms as described herein.

Like the digital content analyzer 700, the chat history analyzer 702 also communicates with the language model generator 704. Indeed, in some embodiments, the language model generator 704 implements the word-to-vector and/or the WMD technique to determine relational rules between content terms from the digital content body as well as between the chat terms identified within the chat history. Accordingly, the language model generator 704 maps the relational rules between chat terms, between the content terms, as well as between chat terms and content terms.

The chat response system 112 also includes a chat question receiver 706. In particular, the chat question receiver 706 can receive a chat question from a user (e.g., user 102) as described above. Additionally, the chat question receiver 706 can analyze the chat question to identify significant terms therein. For instance, the chat question receiver 706 can identify keywords within a chat question. As described above, keywords within a chat question are words that help convey the meaning of the chat question, and are distinguishable from other "filler" words within the chat question.

As further shown in FIG. 7, the chat response system 112 also includes a chat question categorizer 708. In particular, the chat question categorizer 708 can communicate with the chat question receiver 706 as well as the language model generator 704 to, based on the relational rules defined between content terms, chat terms, and/or keywords according to the generated language model, categorize a particular chat question as belonging to a content topic. For example, the chat question categorizer 706 maintains a knowledge of content topics indicated by the content terms identified from within the digital content body and, based on the above-described identification of keywords from the chat question, assigns the chat question to an appropriate content topic. An appropriate content topic can be a content topic associated with content terms that are also within or otherwise associated with the chat question, as described above.

The chat response system 112 of FIG. 7 further includes a response generator 710. In particular, the response generator 710 communicates with the chat question categorizer 708 to identify a content portion associated with the content topic assigned as the category of the received chat question. Upon identifying a content portion from within the digital content body that thereby corresponds to the chat question, the response generator 710 provides that content portion to a user device as a response to the chat question.

As described above, in some embodiments, the response generator 710 further analyzes the matching content portion to generate a natural language response based on the content prescribed as an appropriate response to the chat question. Additionally or alternatively, the response generator 710 mixes and matches pieces of content from various portions within the digital content body to create a response including those pieces of content that match or are sufficiently similar to the chat question. Accordingly, the response generator 710 sends the response to the user device using appropriate electronic communication methods as described below.

The components of the chat response system 112 can comprise hardware, software, or both. For example, the components 700-712 and 300 can comprise one or more instructions stored on a computer-readable storage medium and executable by processors of one or more computing devices, such as a client device or server device. When executed by the one or more processors, the computer-executable instructions of the chat response system 112 can cause the computing device(s) to perform the content analysis, language model generating, and response providing methods described herein. Alternatively, the components 700-712 and 300 can comprise hardware such as a special purpose processing device to perform a certain function or group of functions. Alternatively still, the components 700-712 and 300 of the chat response system 112 can comprise a combination of computer-executable instructions and hardware.

Figure 8:
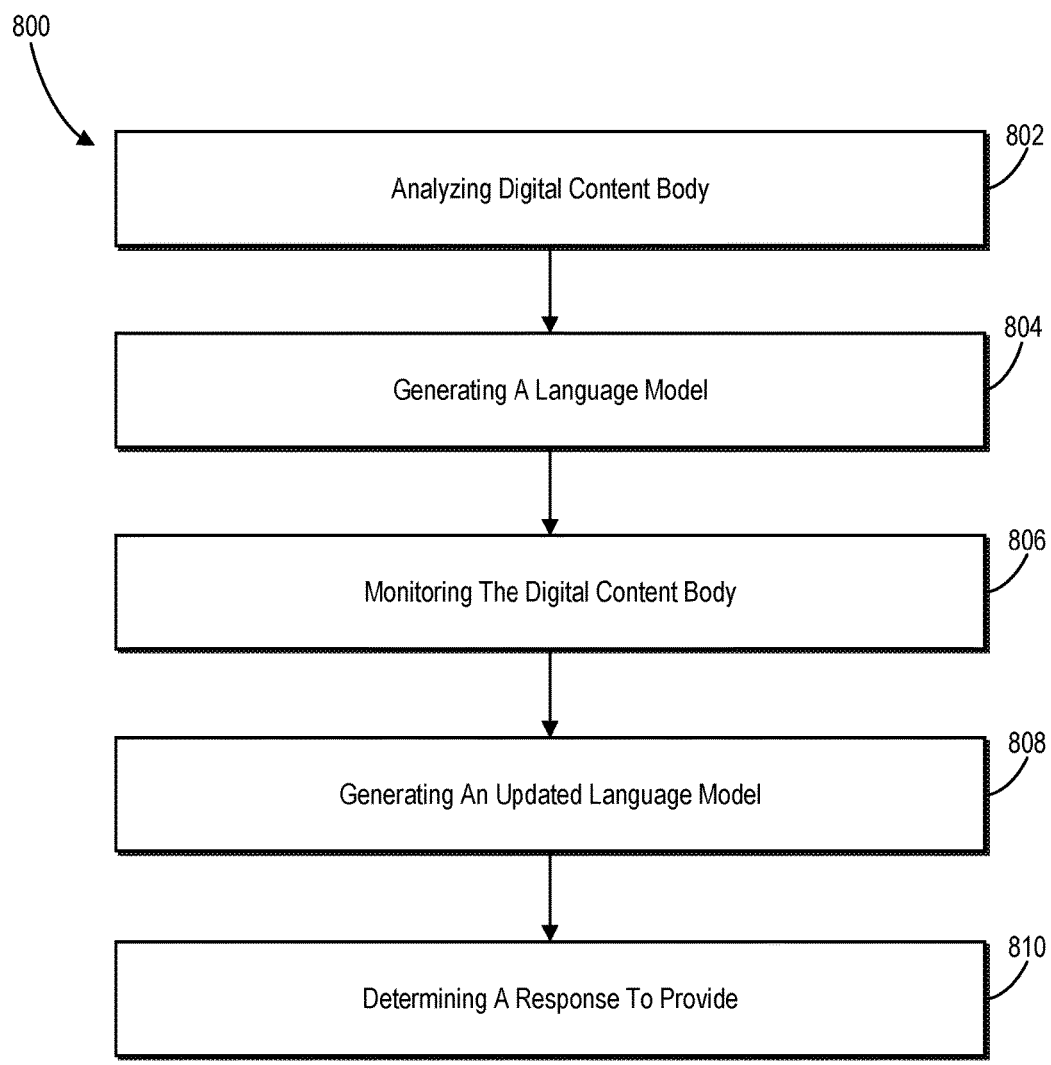
FIG. 8 illustrates a flowchart of a series of acts in a method of analyzing a digital content body and providing a response to a chat question in accordance with one or more embodiments.

FIGS. 1-7, the corresponding text, and the examples provide a number of different systems and methods that manage an automatic chat response system. In addition to the foregoing, embodiments can also be described in terms of flowcharts comprising acts and/or steps in a method for accomplishing a particular result. For example, FIG. 8 illustrates a flowchart of an exemplary method in accordance with one or more embodiments. The method described in relation to FIG. 8 can be performed with fewer or more steps/acts or the steps/acts can be performed in any number of different orders or sequences. Additionally, the steps/acts described herein can be repeated or performed in parallel with one another or in parallel with different instances of the same or other similar steps/acts.

FIG. 8 illustrates a flowchart of a series of acts in a method 800 of providing a response to a chat question via an automated chat response system. In one or more embodiments, the method 800 is performed in a customer support environment or a chat response environment including an administrator device and one or more respondent devices (e.g., performed by software running on one or more computing devices). The method 800 is intended to be illustrative of one or more methods in accordance with the present disclosure, and is not intended to limit potential embodiments. Alternative embodiments can include additional, fewer, or different steps than those articulated herein with respect to FIG. 8.

As illustrated in FIG. 8, the method 800 includes an act 802 of analyzing a digital content body. In particular, the act 802 includes analyzing, by at least one processor, a digital content body including a plurality of content portions to identify, from within the plurality of content portions, content terms corresponding to a plurality of content topics.

In addition, the method 800 of FIG. 8 includes an act 804 of generating a language model. In particular, the act 802 includes generating, based on the identified content terms, a language model that includes one or more relational rules between the identified content terms corresponding to each of the plurality of content topics. For example, the act 802 can involve implementing a word-to-vector algorithm to determine the one or more relational rules between the identified content terms and the identified chat terms. The act 802 can also involve implementing a word mover's distance algorithm to determine a distance between each the chat question and each of the plurality of content topics.

Furthermore, the method 800 includes an act 806 of monitoring the digital content body. In particular, the act 806 includes monitoring the digital content body to detect a change within at least one of the plurality of content portions. The act 806 can still further include detecting, from a content provider, one or more of: an addition of content, a deletion of content, or an alteration of content.

As shown in FIG. 8, the method 800 also includes an act 808 of generating an updated language model. In particular, the act 808 includes in response to detecting the change, generating an updated language model that includes one or more updated relational rules between the identified content terms corresponding to the plurality of content topics based on the changed digital content body. The act 808 can further include adding a new content term corresponding to the plurality of content topics in response to detecting the new content term within the changed digital content body.

Additionally, the act 808 can include modifying one or more content terms corresponding to the plurality of content topics in response to detecting a change to the one or more content terms within the changed digital content body. Additionally still, the act 808 can involve modifying one or more of the plurality of content topics in response to detecting the change within the at least one of the plurality of content portions. The updated language model can include one or more relational rules between the identified chat terms associated with the one or more of the plurality of content topics.

Further illustrated in FIG. 8, the method 800 includes an act 810 of receiving a chat question. In particular, the act 810 includes based on receiving a chat question, determining a response to provide in response to the chat question. For example, the act 810 can involve analyzing the received chat question to identify keywords within the chat question; applying the updated language model to the identified keywords to determine, in accordance with the one or more relational rules, one or more relationships between the identified keywords and the identified content terms of the changed digital content body; and categorizing the chat question to at least one content topic from among the plurality of content topics in accordance with the one or more determined relationships between the identified keywords and the identified content terms. The act 810 can also include sending, to a computing device associated with a user, a content portion from among the plurality of content portions that corresponds to the identified at least one content topic.

The method 800 can further include an act of determining, for each of the plurality of content topics, a relevance to the chat question. Additionally, the method 800 can also include an act of identifying the at least one content topic from among the plurality of content topics as an appropriate content topic for the chat question by comparing the relevance of each of the plurality of content topics to the chat question. Determining a relevance can include analyzing the one or more determined relationships between the identified keywords and the content terms corresponding to each of the plurality of content topics. Furthermore, identifying at least one content topic can include determining that the at least one content topic has a relevance above a relevance threshold.

The method 800 of FIG. 8 can include analyzing a chat history associated with a user to identify chat terms used within the chat history, and can further include associating the identified chat terms with one or more of the plurality of content topics. Additionally, the method 800 can include providing, to the user, the content portion that corresponds to the most relevant content topic. Additionally still, the method 800 can include an act of generating, based on the identified content portion from within the plurality of content portions that corresponds to the most relevant content topic, a natural language response to the chat question, and an act of providing, to the user by way of a user device, the natural language response.

The method 800 can also include receiving a chat question from the user by way of a user device, and in response to receiving the chat question, applying the updated language model to the chat question to determine a relevance of each of the plurality of content topics to the chat question. Additionally, the method 800 can include identifying a content portion from within the plurality of content portions that corresponds to a most relevant content topic to provide as a response to the chat question.

Furthermore, detecting the change of the chat history can include detecting a new entry to the chat history. The method 800 can still further include an act of identifying one or more keywords from within the chat question, wherein applying the updated language model to the chat question includes applying the updated language model to the keywords identified from within the chat question to determine one or more relationships between the identified keywords, the content terms, and the chat terms.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
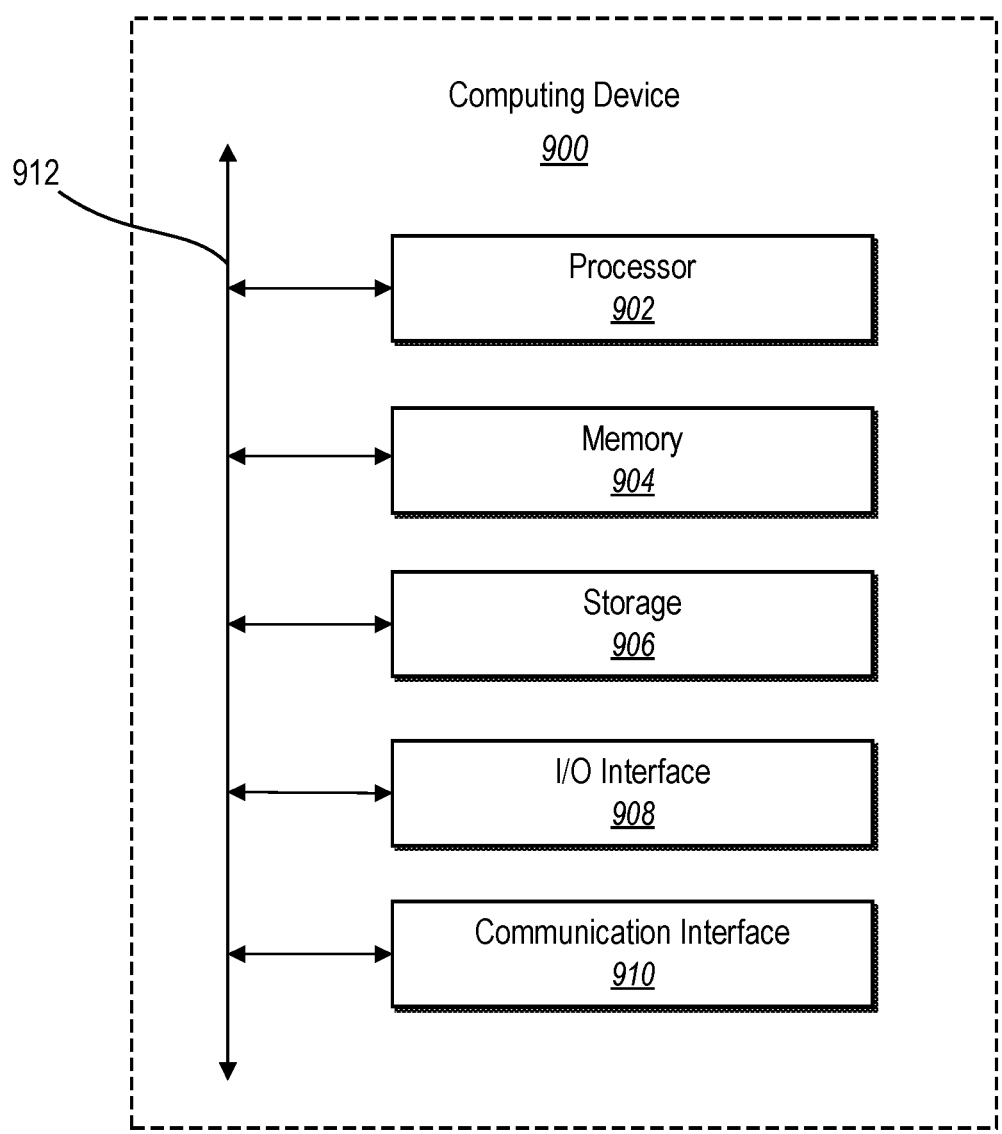
FIG. 9 illustrates a block diagram of an exemplary computing device in accordance with one or more embodiments.

FIG. 9 illustrates, in block diagram form, an exemplary computing device 900 that can be configured to perform one or more of the processes described above. One will appreciate that the chat response system 112 can comprise implementations of the computing device 900. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 can retrieve (or fetch) the instructions from an internal register, an internal cache, memory 904, or a storage device 906 and decode and execute them.

The computing device 900 includes memory 904, which is coupled to the processor(s) 902. The memory 904 can be used for storing data, metadata, and programs for execution by the processor(s). The memory 904 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 can be internal or distributed memory.

The computing device 900 includes a storage device 906 includes storage for storing data or instructions. As an example, and not by way of limitation, storage device 906 can comprise a non-transitory storage medium described above. The storage device 906 can include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 can include a mouse, keypad or a keyboard, a touch screen, camera, optical scanner, network interface, modem, other known I/O devices or a combination of such I/O devices/interfaces 908. The touch screen can be activated with a stylus or a finger.

The I/O devices/interfaces 908 can include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data can be representative of one or more graphical user interfaces and/or any other graphical content as can serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 can include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

Figure 10:
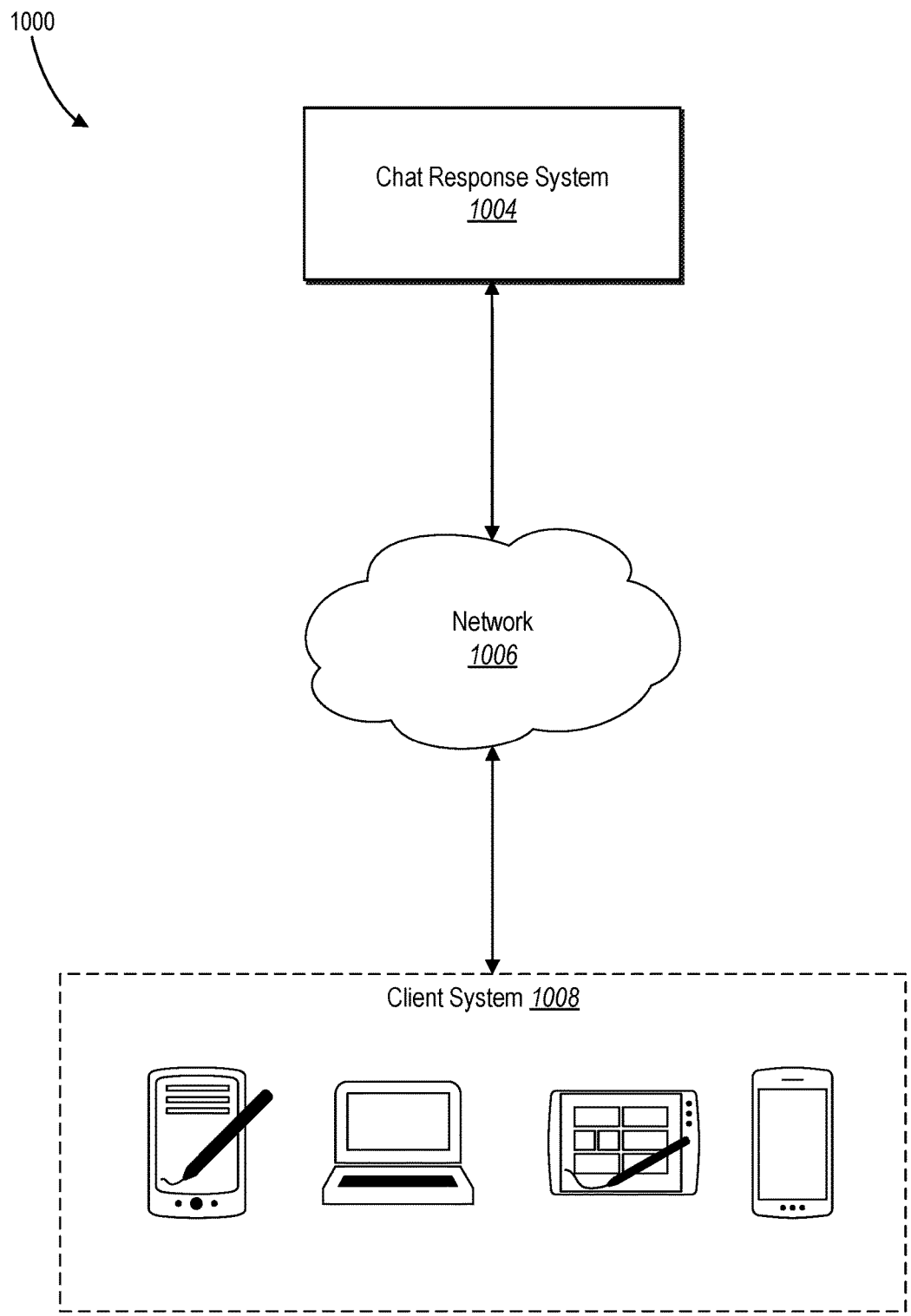
FIG. 10 illustrates an example chat response system in accordance with one or more embodiments.

FIG. 10 illustrates an example network environment 1000 of a chat response system. Network environment 1000 includes a client system 1008 and a chat response system 1004 connected to each other by a network 1006. Although FIG. 10 illustrates a particular arrangement of client system 1008, chat response system 1004, and network 1006, this disclosure contemplates any suitable arrangement of client system 1008, chat response system 1004, and network 1006. As an example, and not by way of limitation, two or more of client system 1008, chat response system 1004, bypassing network 1006. As another example, two or more of client system 1008, and chat response system 1004 can be physically or logically co-located with each other in whole or in part. Moreover, although FIG. 10 illustrates a particular number of client systems 1008, chat response system 1004, and networks 1006, this disclosure contemplates any suitable number of client systems 1008, chat response system 1004, and networks 1006. As an example, and not by way of limitation, network environment 1000 can include multiple client system 1008, chat response system 1004, and networks 1006.

This disclosure contemplates any suitable network 1006. As an example, and not by way of limitation, one or more portions of network 1006 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1006 can include one or more networks 1006.

Links can connect client system 1008, and chat response system 1004 to communication network 1006 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links can differ in one or more respects from one or more second links.

In particular embodiments, client system 1008 can be an electronic device including hardware, software, or embedded logic components or a combination of two or more such components and capable of carrying out the appropriate functionalities implemented or supported by client system 1008. As an example, and not by way of limitation, a client system 1008 can include any of the computing devices discussed above in relation to FIG. 10. A client system 1008 can enable a network user at client system 1008 to access network 1006. A client system 1008 can enable its user to communicate with other users at other client systems 1008.

In particular embodiments, client system 1008 can include a web browser, such as MICROSOFT INTERNET EXPLORER, GOOGLE CHROME or MOZILLA FIRE- FOX, and can have one or more add-ons, plug-ins, or other extensions, such as TOOLBAR or YAHOO TOOLBAR. A user at client system 1008 can enter a Uniform Resource Locator (URL) or other address directing the web browser to a particular server (such as server), and the web browser can generate a Hyper Text Transfer Protocol (HTTP) request and communicate the HTTP request to server. The server can accept the HTTP request and communicate to client system 1008 one or more Hyper Text Markup Language (HTML) files responsive to the HTTP request. Client system 1008 can render a webpage based on the HTML files from the server for presentation to the user. This disclosure contemplates any suitable webpage files. As an example, and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, chat response system 1004 can be a network-addressable computing system that can host an online chat network. Chat response system 1004 can generate, store, receive, and send chat question, chat response data, such as, for example, user-profile data, concept-profile data, text data, or other suitable data related to the online chat network. Chat response system 1004 can be accessed by the other components of network environment 1000 either directly or via network 1006. In particular embodiments, chat response system 1004 can include one or more servers. Each server can be a unitary server or a distributed server spanning multiple computers or multiple datacenters. Servers can be of various types, such as, for example and without limitation, web server, news server, mail server, message server, advertising server, file server, application server, exchange server, database server, proxy server, another server suitable for performing functions or processes described herein, or any combination thereof. In particular embodiments, each server can include hardware, software, or embedded logic components or a combination of two or more such components for carrying out the appropriate functionalities implemented or supported by server. In particular embodiments, chat response system 1004 can include one or more data stores. Data stores can be used to store various types of information. In particular embodiments, the information stored in data stores can be organized according to specific data structures. In particular embodiments, each data store can be a relational, columnar, correlation, or other suitable database. Although this disclosure describes or illustrates particular types of databases, this disclosure contemplates any suitable types of databases. Particular embodiments can provide interfaces that enable a client system 1008, or a chat response system 1004 to manage, retrieve, modify, add, or delete, the information stored in data store.

In particular embodiments, chat response system 1004 can provide users with the ability to take actions on various types of items or objects, supported by chat response system 1004. As an example, and not by way of limitation, the items and objects can include groups or chat networks to which users of chat response system 1004 can belong, events or calendar entries in which a user might be interested, computer-based applications that a user can use, transactions that allow users to buy or sell items via the service, interactions with advertisements that a user can perform, or other suitable items or objects. A user can interact with anything that is capable of being represented in chat response system 1004 or by an external system of a third-party system, which is separate from chat response system 1004 and coupled to chat response system 1004 via a network 1006.

In particular embodiments, chat response system 1004 can be capable of linking a variety of entities. As an example, and not by way of limitation, chat response system 1004 can enable users to interact with each other or other entities, or to allow users to interact with these entities through an application programming interfaces (API) or other communication channels.

In particular embodiments, chat response system 1004 also includes user-generated content objects, which can enhance a user's interactions with chat response system 1004. User-generated content can include anything a user can add, upload, send, or "post" to chat response system 1004. As an example, and not by way of limitation, a user communicates chats to chat response system 1004 from a client system 1008. Chats can include data such as chat questions or other textual data, location information, photos, videos, links, music or other similar data or media. Content can also be added to chat response system 1004 by a third-party through a "communication channel," such as a newsfeed or stream.

In particular embodiments, chat response system 1004 can include a variety of servers, sub-systems, programs, modules, logs, and data stores. In particular embodiments, chat response system 1004 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Chat response system 1004 can also include suitable components such as network interfaces, security mechanisms, load balancers, failover servers, management-and-network-operations consoles, other suitable components, or any suitable combination thereof. In particular embodiments, chat response system 1004 can include one or more user-profile stores for storing user profiles. A user profile can include, for example, biographic information, demographic information, behavioral information, social information, or other types of descriptive information, such as work experience, educational history, hobbies or preferences, interests, affinities, or location.

The web server can include a mail server or other messaging functionality for receiving and routing messages between chat response system 1004 and one or more client systems 1008. An action logger can be used to receive communications from a web server about a user's actions on or off chat response system 1004. In conjunction with the action log, a third-party-content-object log can be maintained of user exposures to third-party-content objects. A notification controller can provide information regarding content objects to a client system 1008. Information can be pushed to a client system 1008 as notifications, or information can be pulled from client system 1008 responsive to a request received from client system 1008. Authorization servers can be used to enforce one or more privacy settings of the users of chat response system 1004. A privacy setting of a user determines how particular information associated with a user can be shared. The authorization server can allow users to opt in to or opt out of having their actions logged by chat response system 1004 or shared with other systems, such as, for example, by setting appropriate privacy settings. Third-party-content-object stores can be used to store content objects received from third parties. Location stores can be used for storing location information received from client systems 1008 associated with users.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention can be embodied in other specific forms without departing from its spirit or essential characteristics. The described embodiments are to be considered in all respects only as illustrative and not restrictive. For example, the methods described herein can be performed with less or more steps/acts or the steps/acts can be performed in differing orders. Additionally, the steps/acts described herein can be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   analyzing, by at least one processor of a digital communication response system, a digital content body comprising a plurality of content portions to identify, from within the plurality of content portions, content terms corresponding to a plurality of content topics;
   analyzing, by the at least one processor, a chat history comprising a plurality of chat messages between one or more client devices and the digital communication response system to identify, from within the plurality of chat messages, chat terms corresponding to the plurality of content topics;
   determining relational rules between the content terms, between the chat terms, and between the content terms and the chat terms;
   generating a language model to map the relational rules for generating responses to chat questions;
   monitoring the digital content body and the chat history to detect a change within at least one of the plurality of content portions of the digital content body or a change within the chat history; and
   in response to detecting the change within the at least one of the plurality of content portions or the change within the chat history, generating an updated language model that comprises one or more updated relational rules between the content terms, between the chat terms, and between the content terms and the chat terms.

2. The method of claim 1, further comprising:
   receiving a chat question originating from a client device;
   determining a response to the chat question by:
      analyzing the received chat question to identify keywords within the chat question;
      applying the updated language model to the keywords to determine, in accordance with the relational rules, one or more relationships between the keywords, the content terms, and the chat terms; and
      categorizing the chat question to at least one content topic from among the plurality of content topics in accordance with the one or more relationships; and
   providing, for presentation on the client device, the response to the chat question.

3. The method of claim 2, further comprising:
   determining, for each of the plurality of content topics, a relevance to the chat question; and
   identifying the at least one content topic from among the plurality of content topics as relevant to the chat question by comparing the relevance of each of the plurality of content topics.

4. The method of claim 3, wherein determining the relevance of each of the plurality of content topics to the chat question comprises analyzing the one or more relationships between the keywords and the content terms corresponding to each of the plurality of content topics.

5. The method of claim 3, wherein identifying the at least one content topic as relevant to the chat question comprises determining that the at least one content topic has a relevance above a relevance threshold.

6. The method of claim 3, wherein providing the response to the chat question comprises sending, to the client device, a content portion from among the plurality of content portions that corresponds to the identified at least one content topic.

7. The method of claim 1, wherein generating the updated language model comprises adding a new content term corresponding to the plurality of content topics in response to detecting the new content term within the digital content body based on monitoring the digital content body.

8. The method of claim 1, wherein generating the updated language model comprises modifying one or more content terms corresponding to the plurality of content topics in response to detecting a change to the one or more content terms within the digital content body.

9. The method of claim 1, wherein generating the updated language model comprises modifying one or more of the plurality of content topics in response to detecting the change within the at least one of the plurality of content portions.

10. The method of claim 1, wherein generating the updated language model is based on detecting a new chat term within the chat history.

11. The method of claim 10, further comprising updating the relational rules based on the new chat term.

12. The method of claim 1, wherein detecting the change within the at least one of the plurality of content portions comprises detecting, from a content provider, one or more of: an addition of content, a deletion of content, or an alteration of content.

13. A non-transitory computer readable medium comprising instructions that, when executed by at least one processor, cause a computer device to:
   analyze a digital content body comprising a plurality of content portions to identify, from within the plurality of content portions, content terms corresponding to a plurality of content topics;
   analyze a chat history comprising a plurality of chat messages from one or more client devices to identify, from within the plurality of chat messages, chat terms corresponding to the plurality of content topics;
   determine relational rules between the content terms, between the chat terms, and between the content terms and the chat terms;

generate a language model to map the relational rules for generating responses to chat questions;

monitor the digital content body and the chat history to detect a change within at least one of the plurality of content portions of the digital content body or a change within the chat history; and in response to detecting the change within the at least one of the plurality of content portions or the change within the chat history, generate an updated language model that comprises one or more updated relational rules between the content terms, between the chat terms, and between the content terms and the chat terms.

14. The non-transitory computer readable medium of claim 13, wherein the instructions cause the computer device to detect the change within the chat history by detecting a new entry to the chat history.

15. The non-transitory computer readable medium of claim 13, further comprising instructions that, when executed by the at least one processor, cause the computer device to:

identify one or more keywords within a chat question received from the client device; and determine one or more relationships between the keywords, the content terms, and the chat terms.

16. The non-transitory computer readable medium of claim 13, wherein the instructions cause the computer device to determine the relational rules by comparing vector representations of the content terms and the chat terms in a vector space.

17. The non-transitory computer readable medium of claim 16, further comprising instructions that, when executed by the at least one processor, cause the computer device to:

determine, in response to receiving a chat question from a client device, a most relevant content topic for the chat question based on applying the updated language model to the chat question; and provide, to the client device, a content portion of the digital content body that corresponds to the most relevant content topic.

18. The non-transitory computer readable medium of claim 17, wherein the instructions cause the computer device to apply the updated language model to the chat question by implementing a word mover's distance algorithm to determine in vector space a distance between a vector representation of the chat question and vector representations of each of the plurality of content topics.

19. The non-transitory computer readable medium of claim 18, further comprising instructions that, when executed by the at least one processor, cause the computer device to:

generate, based on the content portion that corresponds to the most relevant content topic, a natural language response to the chat question; and provide, to the client device, the natural language response.

20. A system comprising:

at least one processor; and a non-transitory computer readable medium comprising instructions thereon that, when executed by the at least one processor, cause the system to:

analyze a digital content body comprising a plurality of content portions to identify, from within the plurality of content portions, content terms corresponding to a plurality of content topics;

analyze a chat history comprising a plurality of chat messages from one or more client devices to identify, from within the plurality of chat messages, chat terms corresponding to the plurality of content topics;

determine relational rules between the content terms, between the chat terms, and between the content terms and the chat terms;

generate a language model to map the relational rules for generating responses to chat questions;

monitor the digital content body and the chat history to detect a change within at least one of the plurality of content portions of the digital content body or a change within the chat history; and in response to detecting the change within the at least one of the plurality of content portions or the change within the chat history, generate an updated language model that comprises one or more updated relational rules between the content terms, between the chat terms, and between the content terms and the chat terms;

receive a chat question originating from a client device; and determine a response to the chat question based on the updated language model.

* * * * *